(12) United States Patent
McMahon et al.

(10) Patent No.: US 11,368,056 B2
(45) Date of Patent: Jun. 21, 2022

(54) EQUIPMENT SYSTEMS INCLUDING COMMUNICATION SYSTEMS, COMMUNICATION SYSTEMS, COMPONENTS OF COMMUNICATION SYSTEMS, AND METHODS OF OPERATING SUCH SYSTEMS AND COMPONENTS

(71) Applicant: MARQUARDT GMBH, Rietheim-Weilheim (DE)

(72) Inventors: Stephen McMahon, Homer, NY (US); Christopher Berry, Manlius, NY (US)

(73) Assignee: Marquardt GmbH, Rietheim-Weilheim (DE)

(*) Notice: Subject to any disclaimer, the term of this patent is extended or adjusted under 35 U.S.C. 154(b) by 0 days.

(21) Appl. No.: 17/023,578

(22) Filed: Sep. 17, 2020

(65) Prior Publication Data
US 2021/0083530 A1    Mar. 18, 2021

Related U.S. Application Data

(60) Provisional application No. 62/902,109, filed on Sep. 18, 2019.

(51) Int. Cl.
*H02J 50/90* (2016.01)
*H02J 50/10* (2016.01)
(Continued)

(52) U.S. Cl.
CPC .............. *H02J 50/90* (2016.02); *H02J 50/60* (2016.02); *H02J 50/80* (2016.02); *H02J 50/10* (2016.02); *H02J 50/20* (2016.02)

(58) Field of Classification Search
CPC .... B62M 2027/028; H02J 50/10; H02J 50/12; H02J 50/20; H02J 50/60; H02J 50/80; H02J 50/90
See application file for complete search history.

(56) References Cited

U.S. PATENT DOCUMENTS 6,352,045 B1    3/2002  Takashima
7,026,912 B2    4/2006  Suzuki
(Continued)

FOREIGN PATENT DOCUMENTS

JP    2001-146148 A1    5/2001
WO    2017/208176 A2    12/2017

OTHER PUBLICATIONS

Dialog Semiconductor Print-out, 2018.

*Primary Examiner* — Levi Gannon
(74) *Attorney, Agent, or Firm* — Burr & Brown, PLLC

(57) ABSTRACT

A communication system, comprising a pendant and a base (comprising a transmitter, a receiver, and a wireless power transmitter) and a pendant (comprising a transmitter, a receiver, and a wireless power receiver configured to wirelessly receive electrical energy from the wireless power transmitter). The transmitters, the receivers, the wireless power receiver, and the wireless power transmitter (at least) are sealed. The communication system is configured affect actions and operations in equipment based on conjectures of whether the pendant is in close proximity or medium proximity to the base by analyzing a power quantity that the wireless power receiver is receiving from the wireless power transmitter, the strength with which a signal emitted from a transmitters is received by a receiver, and/or comparing an extent to which motion detected by a motion detector in the base corresponds to motion detected by a motion detector in the pendant.

4 Claims, 4 Drawing Sheets

Figure 1:
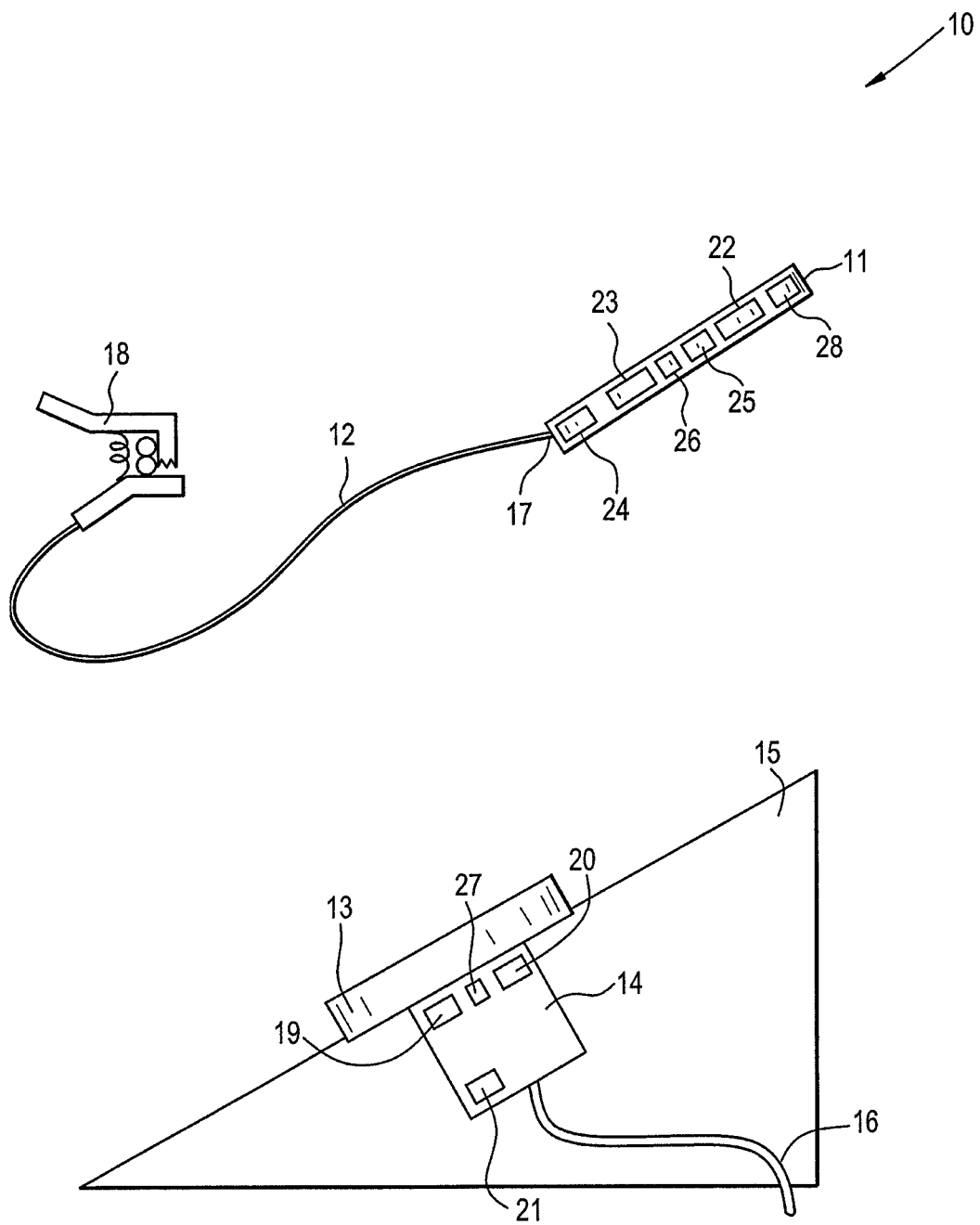

(51) Int. Cl.
    *H02J 50/20*     (2016.01)
    *H02J 50/80*     (2016.01)
    *H02J 50/60*     (2016.01)

(56) References Cited

U.S. PATENT DOCUMENTS

| | | |
|---|---|---|
| 7,109,871 B2 | 9/2006 | Lentine et al. |
| 10,021,523 B2 * | 7/2018 | Leabman ............... H04W 4/80 |
| 10,575,198 B1 * | 2/2020 | Dash ....................... H02J 7/025 |
| 2008/0083797 A1 * | 4/2008 | Myers ................... A45C 13/20<br>224/217 |
| 2009/0258674 A1 * | 10/2009 | Groth ................ H04M 1/72451<br>455/556.1 |
| 2010/0253501 A1 | 10/2010 | Gibson |
| 2013/0058379 A1 * | 3/2013 | Kim ....................... B60L 53/36<br>375/146 |
| 2013/0214744 A1 * | 8/2013 | Kang ..................... H02J 7/02<br>320/162 |
| 2014/0091626 A1 * | 4/2014 | Walley ................... H02J 7/025<br>307/43 |
| 2016/0099602 A1 * | 4/2016 | Leabman ................ H02J 50/23<br>307/104 |
| 2018/0069431 A1 * | 3/2018 | Mastrandrea .......... H02J 50/90 |
| 2018/0102667 A1 * | 4/2018 | Choi ................... H04B 5/0037 |
| 2018/0138752 A1 * | 5/2018 | Wilson ................... H02J 50/80 |
| 2020/0083754 A1 * | 3/2020 | Tian ....................... H02J 50/60 |
| 2020/0091779 A1 * | 3/2020 | Lee ........................ H02J 50/40 |

* cited by examiner

EQUIPMENT SYSTEMS INCLUDING COMMUNICATION SYSTEMS, COMMUNICATION SYSTEMS, COMPONENTS OF COMMUNICATION SYSTEMS, AND METHODS OF OPERATING SUCH SYSTEMS AND COMPONENTS

CROSS-REFERENCE TO RELATED APPLICATIONS

This application claims the benefit under 35 U.S.C. 119 section (e) of U.S. Provisional Patent Application No. 62/902,109, filed Sep. 18, 2019, the entirety of which is incorporated herein by reference.

FIELD OF THE INVENTIVE SUBJECT MATTER

The present inventive subject matter relates to systems that include components that can communicate with each other, and/or in which one or more spatial relationships and/or translational relationships between components is/are detected and used to influence operation of any of such components, other components or one or more pieces of equipment. The present inventive subject matter also relates to methods of operating such components, combinations of such components and/or equipment.

BACKGROUND

There exists an ongoing need to improve, simplify and/or facilitate operation of equipment. There also exists an ongoing need to improve safety of operating equipment, and to improve response when an accident or other event occurs. There also exists an ongoing need to improve efficiency of operation of equipment. There also exists an ongoing need to improve, simplify and/or facilitate operation of equipment and/or reliability of equipment, in combination with: transfer of information and/or sharing of information, safety of operating equipment, improved response when an accident or other event occurs, and/or improved efficiency of operation of equipment.

BRIEF SUMMARY OF THE INVENTIVE SUBJECT MATTER

Some aspects of the present inventive subject matter relate to systems (and components for such systems, e.g., pendants and bases for such systems) that comprise a pendant and a base, in which: the base is attached to equipment (e.g., the base is mounted on a vehicle, such as a snowmobile or a personal water craft); the pendant is associated with an operator, an object or another piece of equipment (e.g., the pendant is engaged with or attached to the operator, object or other piece of equipment, e.g., by a tether); the pendant and the base are capable of communicating with each other (e.g., they can communicate if they are close enough to each other and any obstruction between them is not significant enough to prevent communication); and a wireless power transmitter in the base can supply energy to the pendant to supply electricity to electronic components in the pendant and/or to a rechargeable energy-retention component in the pendant (e.g., a battery or a super capacitor) can be recharged. In some of such systems:

the pendant and the base are configured to be selectively engaged with one another (i.e., they can be engaged with each other and then disengaged from each other, e.g., intentionally or unintentionally), and the pendant and the base being engaged with each other is indicative of (1) an operator being in a position from which the operator can properly operate the piece of equipment, or a second piece of equipment being properly connected to a first piece of equipment, or (2) an object or other piece of equipment being in a particular position (and the pendant and the base becoming (or being) disengaged from each other being indicative of the operator not being in a position from which the operator can properly operate the equipment, or of the second piece of equipment coming dislodged from the first piece of equipment, e.g., a trailer becoming dislodged from a trailer hitch), and/or the system is configured to conjecture (1) whether one or more components in the pendant is/are in close proximity to one or more respective components in the base (e.g., whether a wireless power receiver in the pendant is in close proximity to a wireless power transmitter in the base, an electromagnetic signal receiver in the pendant is in close proximity to an electromagnetic signal transmitter in the base, and/or an electromagnetic signal receiver in the base is in close proximity to an electromagnetic signal transmitter in the pendant), such close proximity being indicative of the pendant being engaged with the base (and therefore is indicative of (1) an operator being in a position from which the operator can properly operate the piece of equipment, or (2) an object or other piece of equipment being in a particular position), and/or the system is configured to conjecture (1) whether one or more components in the pendant is/are in medium proximity to one or more respective components in the base (e.g., whether an electromagnetic signal receiver in the pendant is in medium proximity to an electromagnetic signal transmitter in the base, and/or an electromagnetic signal receiver in the base is in medium proximity to an electromagnetic signal transmitter in the pendant), such medium proximity being indicative of the pendant being near a location where it can be engaged with the base (and therefore is indicative of the operator being close to a proper position to operate the piece of equipment (and possibly approaching a position to operate the piece of equipment), or the object or other piece of equipment being close to a particular position), and/or the pendant has a pendant motion sensor (configured to detect a direction and speed of motion of the pendant, and/or to detect direction and magnitude of acceleration of the pendant), and the base has a base motion sensor (configured to detect a direction and speed of motion of the base, and/or to detect direction and magnitude of acceleration of the base), and the system is configured to compare information detected by the pendant motion sensor with information detected by the base motion sensor to assess whether the pendant and the base are (A) moving in tandem (which is indicative of the pendant being engaged with the base (and therefore is indicative of (1) an operator being in a position from which the operator can properly operate the piece of equipment, or (2) an object or other piece of equipment being in a particular position and/or engaged with another piece of equipment), (B) moving in similar but not identical ways, which is indicative of the pendant being near a location where it can be engaged with the base (and therefore is indicative of the operator being close to a proper position to operate the piece of equipment, or the object or other piece of equipment being close to a particular position), or (C) moving in significantly different ways, which is indicative of the operator or object having fallen off the piece of equipment, or, e.g., the other piece of equipment having become disconnected from the piece of equipment (e.g., a trailer becoming dislodged from a trailer hitch, a train car becoming dislodged from another train car, etc.).

The present inventive subject matter also provides such systems (and components for such systems) in which:

the system is configured to conjecture whether a wireless power receiver in the pendant is in close proximity to a wireless power transmitter in the base, based on whether a power quantity that a wireless power receiver in the pendant is receiving from a wireless power transmitter in the base is equal to or greater than a threshold power quantity, and/or the system is configured to conjecture whether an electromagnetic signal receiver in the pendant is in close proximity to an electromagnetic signal transmitter in the base, based on whether a detected signal-reception-strength value, of a signal sent from the transmitter in the base and received by the receiver in the pendant, is equal to or greater than an upper threshold signal-reception-strength value, and/or the system is configured to conjecture whether an electromagnetic signal receiver in the base is in close proximity to an electromagnetic signal transmitter in the pendant, based on whether a detected signal-reception-strength value, of a signal sent from the transmitter in the pendant and received by the receiver in the base, is equal to or greater than an upper threshold signal-reception-strength value, and/or the system is configured to conjecture whether an electromagnetic signal receiver in the pendant is in medium proximity to an electromagnetic signal transmitter in the base, based on whether a detected signal-reception-strength value, of a signal sent from the transmitter in the base and received by the receiver in the pendant, is less than an upper threshold signal-reception-strength value and equal to or greater than a lower threshold signal-reception-strength value, and/or the system is configured to conjecture whether an electromagnetic signal receiver in the base is in medium proximity to an electromagnetic signal transmitter in the pendant, based on whether a detected signal-reception-strength value, of a signal sent from the transmitter in the pendant and received by the receiver in the base, is less than an upper threshold signal-reception-strength value and equal to or greater than a lower threshold signal-reception-strength value, and/or the system is configured to conjecture whether the pendant is engaged with the base, and/or whether the pendant is in medium proximity to the base, based on comparing an extent to which motion detected by the base motion detector corresponds to motion detected by the pendant motion detector.

The present inventive subject matter also provides such systems (and components for such systems) in which the control by the system of one or more aspects of the functioning of a piece of equipment and/or the functioning of one or more components of the system (and/or the functioning of other components)(or the influencing on such aspects by the system) is configured to be affected based on one or more of: conjectured degrees of proximity between the pendant and the base (and/or one or more respective components of the pendant and the base), sequences of such conjectured degrees of proximity, detected speed, direction of travel and/or acceleration of the pendant, detected speed, direction of travel and/or acceleration of the base, comparisons between the speed, direction of travel and/or acceleration of the pendant and the speed, direction of travel and/or acceleration of the base, and other data (e.g., orientation of the base and/or orientation of the pendant). Such "one or more aspects of the functioning of a piece of equipment and/or the functioning of one or more components of the system (and/or the functioning of other components)" includes, e.g., (and is not limited to) aspects such as:

the system automatically sends a signal (e.g., a signal indicating that there is an emergency, such as an "SOS" signal), and/or the system automatically commands the piece of equipment to perform one or more particular actions or functions (and/or to cease performing one or more particular actions or functions)(e.g., the system commands the piece of equipment to slow to a stop if the vehicle is moving at 30 mph and the conjectured proximity changes from close to medium, or from close to remote; or the system commands lights on the piece of equipment to turn on if the conjectured proximity changes to medium after a period of time that was devoid of conjectured close proximity or conjectured medium proximity), and/or the type or types of information that is/are communicated between the base and the pendant is controlled (e.g., the system decides whether communication of the information is authorized or not authorized), and/or commands entered on the pendant are performed or not performed (e.g., the systems decides whether such commands are authorized or not authorized), and/or the system automatically commands another piece of equipment to perform one or more particular actions or functions (and/or commands another piece of equipment to cease performing one or more particular actions or functions), and/or the system determines whether a pendant (and/or an operator using a pendant) is authorized to cause the system to take particular actions (and/or the system determines the actions, or level of access, that the pendant (and/or operator using the pendant) is authorized to cause the system to take), e.g., by comparing an identification signal received from the pendant with a list of authorized identification signals (or with rules that an identification signal must satisfy) to determine whether the identification signal is valid, and/or by determining whether a PIN entered by the operator is a valid PIN.

Such functioning provides the capability of having any of a wide variety of specific operations to be caused to occur upon various events (or combinations of events) happening (e.g., upon the system and/or other components, as a result of something (or some things) that occur, detecting various things, and/or the system making particular conjectures, and/or an operator making specific commands or requests, etc.). That is, systems in accordance with the present inventive subject matter are not necessarily configured to perform the following actions, but they have the capability of being configured to perform the following representative actions (and there are many other representative actions that the systems are capable of being configured to take upon the occurrence of various things, i.e., following representative actions are only a few of the many possible representative actions that the systems can be configured to take upon the occurrence of various things), i.e., the present inventive subject matter encompasses:

a system that is configured such that it would perform any one or more of the following things if an operator were riding on a piece of equipment and traveling 30 miles per hour, with the pendant engaged with the base, and then the operator falls off of the piece of equipment, causing the pendant to disengage from the base, and causing the operator to become spaced 15 meters from the piece of equipment (e.g., the system is configured such that (at least) if the piece of equipment is moving and there is a change (while the piece of equipment is moving) from the pendant being in close proximity to the base to the pendant being in medium proximity to the base (or not being in close proximity or medium proximity), the system issues a command that causes the piece of equipment to stop moving):

the system changes from conjecturing that the pendant is in close proximity to conjecturing that the pendant is not in close proximity and is not in medium proximity (e.g., as a result of (1) a power quantity that a wireless power receiver in the pendant is receiving from a wireless power transmitter in the base changing from being greater than a threshold power quantity to being less than the threshold power quantity (including zero power), and/or (2) a detected signal-reception-strength value, of a signal sent from the transmitter in the base and received by the receiver in the pendant, changing from a value that is equal to or greater than an upper threshold signal-reception-strength value, to a value that is less than a lower threshold signal-reception-strength value (including a value of zero), and/or (3) a detected signal-reception-strength value, of a signal sent from the transmitter in the pendant and received by the receiver in the base, changing from a value that is equal to or greater than an upper threshold signal-reception-strength value, to a value that is less than a lower threshold signal-reception-strength value (including a value of zero), and/or (4) an extent to which motion detected by a motion detector in the base corresponds to motion detected by a motion detector in the pendant decreasing by a large extent (e.g., a change that is more than a threshold change), the system causes an event signal to be sent (e.g., from the base or from a processor in the piece of equipment to an emergency dispatcher), the event signal indicating that the operator might need assistance, the system causes an event signal to be sent (e.g., from the base or from a processor in the piece of equipment to an emergency dispatcher), the event signal indicating that the operator might be injured, the system causes an event signal to be sent (e.g., from the base or from a processor in the piece of equipment to an emergency dispatcher), the event signal indicating that the operator might is conjectured to have fallen off of the piece of equipment at a speed of 30 miles per hour, the system (1) causes an event signal to be sent to an emergency dispatcher (e.g., from the base or from a processor (i.e., a processor can send a signal or cause a signal to be sent) in the piece of equipment), the event signal indicating that the operator is likely to have been injured, (2) causes a signal to be sent to the base, instructing the base to attempt to send a signal to the pendant every minute for the next ten minutes (unless the operator responds with a signal stating that the operator does not need assistance), requesting that the operator advise as to whether the operator needs assistance, and (3) if the base does not receive, within ten minutes, a signal from the operator, indicating that the operator does not need assistance, the base sends a signal (or a processor causes a signal to be sent) advising the emergency dispatcher that the operator has not responded to requests for the operator's status, the system causes a slow/stop signal to be sent to the piece of equipment (e.g., to the base and/or to a processor in the piece of equipment), commanding the piece of equipment to slow to a stop (if the piece of equipment is still moving) and switch out of any forward gear.

a system that is configured such that it would perform any one or more of the following things if an operator were riding on a piece of equipment and traveling 25 miles per hour, with the pendant engaged with the base, and then the piece of equipment strikes a tree, causing the pendant to become disengaged from the base but the operator remains on the piece of equipment or near the piece of equipment (e.g., the system is configured such that—at least—if there is a change (while the piece of equipment is moving) from the pendant being in close proximity to the base to the pendant being in medium proximity to the base, the system issues a command that causes the piece of equipment to stop moving):

the system changes from conjecturing that the pendant is in close proximity to conjecturing that the pendant is not in close proximity (e.g., as a result of (1) a power quantity that a wireless power receiver in the pendant is receiving from a wireless power transmitter in the base changing from being greater than a threshold power quantity to being less than the threshold power quantity (including a value of zero), and/or (2) a detected signal-reception-strength value, of a signal sent from the transmitter in the base and received by the receiver in the pendant, changing from a value that is equal to or greater than an upper threshold signal-reception-strength value, to a value that is less than the upper threshold signal-reception-strength value and equal to or greater than a lower threshold signal-reception-strength value, and/or (3) a detected signal-reception-strength value, of a signal sent from the transmitter in the pendant and received by the receiver in the base, changing from a value that is equal to or greater than an upper threshold signal-reception-strength value, to a value that is less than the upper threshold signal-reception-strength value and equal to or greater than a lower threshold signal-reception-strength value, and/or (4) motion detected by a motion detector in the base changes abruptly (e.g., within 3 seconds) from 25 miles per hour to 0 miles per hour, and/or (5) motion detected by a motion detector in the pendant changes abruptly (e.g., within 3 seconds) from 25 miles per hour to 0 miles per hour, the system causes an event signal (corresponding to any of the event signals described above) to be sent to an emergency dispatcher, the system causes a slow/stop signal (corresponding to the slow/stop signal described above) to be sent to the piece of equipment;

a system that is configured such that it would send a possible accident signal (and/or slow a piece of equipment to a stop) if the piece of equipment were traveling 45 miles per hour and strikes a fence, slowing the piece of equipment to 15 miles per hour within three seconds, a system that is configured such that it would perform any one or more of the following things if an operator (to whom a pendant is attached with a tether) approaches a piece of equipment (such that the system determines that the pendant is in medium proximity or close proximity to the base), and within a preselected period of time (e.g., 20 seconds), all of the following occur:
- the pendant transmitter periodically (e.g., every five seconds) sends an advertisement signal that includes an identification signal,
- the base receiver receives an advertisement signal from the pendant transmitter, and the system compares the identification signal with a list of authorized identification signals (or with rules that an identification signal must satisfy) to determine whether the identification signal is valid,
- if the system determines that the identification signal is valid, the system issues a command that one or more lights on the piece of equipment be turned on, and/or that one or more computer functions in the piece of equipment be activated;

a system that is configured such that it would perform any one or more of the following things if an operator (to whom a pendant is attached with a tether) sends a request that the piece of equipment turn on its engine, and within a preselected period of time (e.g., 20 seconds), all of the following occur:
- the system causes the base transmitter to send a signal to the pendant receiver, requesting that the pendant send its identification signal,
- in response to the signal requesting that the pendant send its identification signal, the pendant transmitter sends to the base receiver a signal including its identification signal,
- the system compares the identification signal with a list of authorized identification signals to determine whether the identification signal is valid,
- if the system determines that the identification signal is valid, the system causes the base transmitter to send an inquiry signal to the pendant receiver, the inquiry signal requesting that the operator indicate his or her PIN,
- if, in response to the inquiry signal, the operator enters a valid PIN, the system conjectures whether the pendant is in close proximity to the base or in medium proximity to the base,
- if the system conjectures that the pendant is in close proximity to the base or in medium proximity to the base, the system issues a command that the engine in the piece of equipment be turned on and idle;

a system that is configured such that it would perform any one or more of the following things if an operator (to whom a pendant is attached with a pendant) sends a request that the system indicate the location of a second piece of equipment, and within a preselected period of time (e.g., 20 seconds), all of the following occur:
- the system causes the base transmitter to send a signal to the pendant receiver, requesting that the pendant send its identification signal,
- in response to the signal requesting that the pendant send its identification signal, the pendant transmitter sends to the base receiver a signal including its identification signal,
- the system compares the identification signal with a list of authorized identification signals to determine whether the identification signal is valid,
- if the system determines that the identification signal is valid, the system causes the base transmitter to send an inquiry signal to the pendant receiver, the inquiry signal requesting that the operator indicate his or her PIN,
- if, in response to the inquiry signal, the operator enters a valid PIN, the system conjectures whether the pendant is in close proximity to the base or in medium proximity to the base,
- if the system conjectures that the pendant is in close proximity to the base or in medium proximity to the base, the system causes the base transmitter to send to the pendant receiver information regarding the location of the second piece of equipment.

In some embodiments, the system is configured such that any one or more of the above capabilities is/are provided, and an operator can send messages (e.g., a request for assistance—such as an SOS signal) through the pendant (for example, such message can be sent from the pendant transmitter to the base receiver, from the base to a processor in the equipment (e.g., an ECU)(via RF or via a serial port), and from the processor to one or more sites that can initiate the provision of assistance (e.g., emergency assistance) via any communication type, e.g., satellite communication.

A first aspect of the present inventive subject matter is directed to a communication system, comprising a pendant and a base,
the pendant comprising:
a pendant electromagnetic signal transmitter;
a pendant electromagnetic signal receiver; and
a wireless power receiver;
the base comprising:
a base electromagnetic signal transmitter;
a base electromagnetic signal receiver; and
a wireless power transmitter,
the wireless power receiver configured to wirelessly receive electrical energy from the wireless power transmitter, and
the pendant electromagnetic signal transmitter, the pendant electromagnetic signal receiver, the wireless power receiver, the base electromagnetic signal transmitter, the base electromagnetic signal receiver and the wireless power transmitter are sealed.

As described below, any suitable components can be used for pendant electromagnetic signal transmitters, pendant electromagnetic signal receivers, base electromagnetic signal transmitters and base electromagnetic signal receivers in pendants, bases, communication systems and equipment systems in accordance with the present inventive subject matter, and persons of skill in the art are familiar with a wide variety of such components. A pendant electromagnetic signal transmitter and a pendant electromagnetic signal receiver can together comprise a single pendant electromagnetic signal transceiver, and a base electromagnetic signal transmitter and a base electromagnetic signal receiver can together comprise a single base electromagnetic signal transceiver (in other words, a pendant electromagnetic signal transceiver constitutes a pendant electromagnetic signal transmitter and a pendant electromagnetic signal receiver, and a base electromagnetic signal transceiver constitutes a base electromagnetic signal transmitter and a base electromagnetic signal receiver). The expression "transmitter" is used herein to refer to components that are capable of emitting signals; the expression "receiver" is used herein to refer to components that are capable of receiving signals; the expression "transceiver" is used herein to refer to components that are capable of sending signals and receiving signals.

In some embodiments according to the first aspect of the present inventive subject matter, which can include or not include, as suitable, any of the other features described herein, the pendant further comprises an energy-retention component and a charger, in which the charger is configured to charge the energy-retention component, and the energy-retention component and the charger are sealed.

In some embodiments according to the first aspect of the present inventive subject matter, which can include or not include, as suitable, any of the other features described herein, the communication system is configured to conjecture whether the pendant is in close proximity to the base, and the communication system is configured to conjecture whether the pendant is in medium proximity to the base.

In some embodiments according to the first aspect of the present inventive subject matter, which can include or not include, as suitable, any of the other features described herein, the pendant is configured to determine a magnitude of power that the wireless power receiver is receiving from the wireless power transmitter.

In some embodiments according to the first aspect of the present inventive subject matter, which can include or not include, as suitable, any of the other features described herein:
- the pendant is configured to determine a magnitude of power that the wireless power receiver is receiving from the wireless power transmitter, and
- the pendant and/or the communication system is configured to cause a power-quantity-received close-proximity signal to be sent upon determining that the wireless power receiver is receiving, from the wireless power transmitter, power that is equal to or greater than a threshold power quantity.

In some embodiments according to the first aspect of the present inventive subject matter, which can include or not include, as suitable, any of the other features described herein, the base comprises a signal-reception-strength detector that is configured to detect a strength with which an electromagnetic signal emitted by the pendant electromagnetic signal transmitter is received by the base electromagnetic signal receiver.

In some embodiments according to the first aspect of the present inventive subject matter, which can include or not include, as suitable, any of the other features described herein:
- the base comprises a signal-reception-strength detector that is configured to detect a strength with which an electromagnetic signal emitted by the pendant electromagnetic signal transmitter is received by the base electromagnetic signal receiver,
- the communication system is configured to cause a reception-strength close-proximity signal to be sent if the detected signal-reception-strength value is equal to or greater than an upper threshold signal-reception-strength value, and/or
- the communication system is configured to cause a reception-strength medium-proximity signal to be sent if the detected signal-reception-strength value is less than the upper threshold signal-reception-strength value and equal to or greater than a lower threshold signal-reception-strength value.

In some embodiments according to the first aspect of the present inventive subject matter, which can include or not include, as suitable, any of the other features described herein, the pendant comprises a signal-reception-strength detector that is configured to detect a strength with which an electromagnetic signal emitted by the base electromagnetic signal transmitter is received by the pendant electromagnetic signal receiver.

In some embodiments according to the first aspect of the present inventive subject matter, which can include or not include, as suitable, any of the other features described herein:
- the pendant comprises a signal-reception-strength detector that is configured to detect a strength with which an electromagnetic signal emitted by the base electromagnetic signal transmitter is received by the pendant electromagnetic signal receiver,
- the communication system is configured to cause a reception-strength close-proximity signal to be sent if the detected signal-reception-strength value is equal to or greater than an upper threshold signal-reception-strength value, and/or
- the communication system is configured to cause a reception-strength medium-proximity signal to be sent if the detected signal-reception-strength value is less than the upper threshold signal-reception-strength value and equal to or greater than a lower threshold signal-reception-strength value.

In some embodiments according to the first aspect of the present inventive subject matter, which can include or not include, as suitable, any of the other features described herein, the base comprises a base motion detector, and the pendant comprises a pendant motion detector.

In some embodiments according to the first aspect of the present inventive subject matter, which can include or not include, as suitable, any of the other features described herein:
- the base comprises a base motion detector, and the pendant comprises a pendant motion detector,
- the communication system is configured to compare an extent to which motion detected by the base motion detector corresponds to motion detected by the pendant motion detector,
- the communication system is configured to cause a motion-detector close-proximity signal to be sent upon the communication system determining that an extent to which motion detected by the base motion detector is similar to motion detected by the pendant motion detector is equal to or greater than an upper threshold extent,
- the communication system is configured to cause a motion-detector medium-proximity signal to be sent upon the communication system determining that an extent to which motion detected by the base motion detector is similar to motion detected by the pendant motion detector is less than an upper threshold extent and is equal to or greater than a lower threshold extent, and/or
- the communication system is configured to cause a motion-detector remote signal to be sent upon the communication system determining that an extent to which motion detected by the base motion detector is similar to motion detected by the pendant motion detector is less than a lower threshold extent.

In some embodiments according to the first aspect of the present inventive subject matter, which can include or not include, as suitable, any of the other features described herein, the communication system is configured to issue a command that stops a piece of equipment to which the base is attached upon a change, while the piece of equipment is moving, from (1) the pendant being conjectured to be in close proximity to the base to (2) the pendant being conjectured to not be in close proximity to the base.

In some embodiments according to the first aspect of the present inventive subject matter, which can include or not include, as suitable, any of the other features described herein, the communication system is configured to send a possible accident signal upon a change, while a piece of equipment to which the base is attached is moving at a rate of at least a threshold speed, from (1) the pendant being conjectured to be in close proximity to the base to (2) the pendant being conjectured to not be in close proximity to the base.

In some embodiments according to the first aspect of the present inventive subject matter, which can include or not include, as suitable, any of the other features described herein, the communication system is configured to send a possible accident signal upon a change in speed, of a piece of equipment to which the base is attached, of at least a threshold speed change amount within a threshold speed change time period.

In some embodiments according to the first aspect of the present inventive subject matter, which can include or not include, as suitable, any of the other features described herein, the pendant electromagnetic signal transmitter is configured to periodically send an advertisement signal that includes an identification signal.

In some embodiments according to the first aspect of the present inventive subject matter, which can include or not include, as suitable, any of the other features described herein, the communication system is configured to issue a command that causes one or more lights on a piece of equipment to which the base is attached to be turned on upon both of (1) and (2) occurring within a preselected period of time:
 (1) the communication system determining that the pendant is in medium proximity or near proximity to the base, and
 (2) the communication system determining that an identification signal received from the pendant is valid.

In some embodiments according to the first aspect of the present inventive subject matter, which can include or not include, as suitable, any of the other features described herein, the communication system is configured to issue a command that an engine in a piece of equipment to which the base is attached be turned on and idle upon all of (1)-(4) occurring within a preselected period of time:
 (1) the communication system determining that the pendant is in close proximity or medium proximity to the base,
 (2) the communication system determining that an identification signal received from the pendant is valid,
 (3) the communication system determining that a PIN received from the pendant is valid, and
 (4) the base electromagnetic signal receiver receiving, from the pendant electromagnetic signal transmitter, a request that the piece of equipment turn on its engine.

In some embodiments according to the first aspect of the present inventive subject matter, which can include or not include, as suitable, any of the other features described herein, the communication system is configured to issue a command that an engine in a piece of equipment to which the base is attached be turned on and idle upon all of (1)-(3) occurring within a preselected period of time:
 (1) the communication system determining that the pendant is in close proximity or medium proximity to the base,
 (2) the communication system determining that an identification signal received from the pendant is valid, and
 (3) the base electromagnetic signal receiver receiving, from the pendant electromagnetic signal transmitter, a request that the piece of equipment turn on its engine.

A second aspect of the present inventive subject matter is directed to an equipment system that comprises a communication system (e.g., as described above) and at least a first piece of equipment, the base attached to the first piece of equipment.

In some embodiments according to the second aspect of the present inventive subject matter, which can include or not include, as suitable, any of the other features described herein, the equipment system comprises at least a first processor.

In some embodiments according to the second aspect of the present inventive subject matter, which can include or not include, as suitable, any of the other features described herein:
 the communication system is configured to conjecture whether the pendant is in close proximity to the base,
 the communication system is configured to conjecture whether the pendant is in medium proximity to the base,
 the equipment system comprises at least a first processor,
 the first processor is configured to receive close-proximity signals and medium-proximity signals from at least one component of the communication system, and
 the first processor is configured to make a temporal sequence of conjectures as to whether the pendant is (i) in close proximity to the base, (ii) in medium proximity to the base, or (iii) remote from the base, based on receipt by the first processor of a temporal sequence of events selected from among (i.e., which may include or not include): (1) receipt of close-proximity signals, (2) receipt of medium-proximity signals, (3) receipt of remote signals, and (4) time passages devoid of receipt of any signal selected from among close-proximity signals and medium-proximity signals. In some of such embodiments, the first processor is configured to change among a plurality of equipment-operation modes based on said temporal sequence of conjectures, each said equipment-operation mode comprising at least one of:
 controlling functions automatically performed by the first piece of equipment based on (1) the temporal sequence of conjectures alone or (2) a combination of the temporal sequence of conjectures alone and one or more other pieces of data;
 controlling functions automatically performed by the first processor based on (1) the temporal sequence of conjectures alone or (2) a combination of the temporal sequence of conjectures alone and one or more other pieces of data;
 controlling whether information is provided to an authorized user upon the authorized user requesting such information;
 controlling whether functions are performed by the first piece of equipment upon the authorized user requesting that the first piece of equipment perform such functions;

controlling whether a signal is sent to at least a second piece of equipment, instructing the at least a second piece of equipment to perform one or more activities; and controlling whether the first piece of equipment and at least a second piece of equipment perform activities in relation to one another.

In some embodiments according to the second aspect of the present inventive subject matter, which can include or not include, as suitable, any of the other features described herein:

the communication system is configured to conjecture whether the pendant is in close proximity to the base, the communication system is configured to conjecture whether the pendant is in medium proximity to the base, the equipment system comprises at least a first processor, the first processor is configured to receive close-proximity signals and medium-proximity signals from the base, the first processor is configured to make a temporal sequence of conjectures as to whether the pendant is (i) in close proximity to the base, (ii) in medium proximity to the base, or (iii) remote from the base, based on receipt by the first processor of a temporal sequence of events selected from among (i.e., which may include or not include) (1) receipt of base-transmitted close-proximity signals, (2) receipt of base-transmitted medium-proximity signals, (3) receipt of remote signals, and (4) time passages devoid of receipt of any signal selected from among base-transmitted close-proximity signals and base-transmitted medium-proximity signals, and the first processor is configured to change among a plurality of equipment-operation modes based on said temporal sequence of conjectures, each said equipment-operation mode comprising at least one of:

controlling functions automatically performed by the first piece of equipment based on (1) the temporal sequence of conjectures alone or (2) a combination of the temporal sequence of conjectures alone and one or more other pieces of data;

controlling functions automatically performed by the first processor based on (1) the temporal sequence of conjectures alone or (2) a combination of the temporal sequence of conjectures alone and one or more other pieces of data;

controlling whether information is provided to an authorized user upon the authorized user requesting such information;

controlling whether functions are performed by the first piece of equipment upon the authorized user requesting that the first piece of equipment perform such functions; and controlling whether the first piece of equipment and at least a second piece of equipment perform activities in relation to one another.

A third aspect of the present inventive subject matter is directed to a pendant, comprising:

a pendant electromagnetic signal transmitter;
a pendant electromagnetic signal receiver; and
a wireless power receiver, the wireless power receiver is configured to receive electrical energy wirelessly, the pendant electromagnetic signal transmitter, the pendant electromagnetic signal receiver, and the wireless power receiver are sealed.

A fourth aspect of the present inventive subject matter is directed to a base, comprising:

a base electromagnetic signal transmitter;
a base electromagnetic signal receiver; and
a wireless power transmitter, the base electromagnetic signal transmitter, the base electromagnetic signal receiver, and the wireless power transmitter are sealed.

A fifth aspect of the present inventive subject matter is directed to a method of communicating, comprising conjecturing a degree of proximity of a pendant (e.g., as described herein) to a base (e.g., as described herein) by at least one action selected from among the group consisting of:

determining whether a power quantity that a wireless power receiver in the pendant is receiving from a wireless power transmitter in the base is equal to or greater than a threshold power quantity;

determining whether a detected signal-reception-strength value, of a signal sent from a transmitter in the base and received by a receiver in the pendant, is equal to or greater than an upper threshold signal-reception-strength value;

determining whether a detected signal-reception-strength value, of a signal sent from a transmitter in the pendant and received by a receiver in the base, is equal to or greater than the upper threshold signal-reception-strength value; and comparing an extent to which motion detected by a motion detector in the base corresponds to motion detected by a motion detector in the pendant.

In some embodiments according to the fifth aspect of the present inventive subject matter, which can include or not include, as suitable, any of the other features described herein, the method comprises:

determining whether a power quantity that the wireless power receiver in the pendant is receiving from the wireless power transmitter in the base is equal to or greater than a threshold power quantity, and at least one of:

determining whether a detected signal-reception-strength value, of a signal sent from the transmitter in the base and received by the receiver in the pendant, is equal to or greater than an upper threshold signal-reception-strength value, and determining whether a detected signal-reception-strength value, of a signal sent from the transmitter in the pendant and received by the receiver in the base, is equal to or greater than the upper threshold signal-reception-strength value.

In some embodiments according to the fifth aspect of the present inventive subject matter, which can include or not include, as suitable, any of the other features described herein, the method further comprises charging an energy-retention component in the pendant with at least some of said electrical energy received by the wireless power receiver.

In some embodiments according to the fifth aspect of the present inventive subject matter, which can include or not include, as suitable, any of the other features described herein, a piece of equipment to which the base is attached stops moving upon a change, while the piece of equipment is moving, from (1) the pendant being conjectured to be in close proximity to the base to (2) the pendant being conjectured to not be in close proximity to the base.

In some embodiments according to the fifth aspect of the present inventive subject matter, which can include or not include, as suitable, any of the other features described herein, the base and the pendant are part of a communication system, and the communication system sends a possible accident signal upon a change, while a piece of equipment to which the base is attached is moving at a rate of at least a threshold speed, from (1) the pendant being conjectured to be in close proximity to the base to (2) the pendant being conjectured to not be in close proximity to the base.

In some embodiments according to the fifth aspect of the present inventive subject matter, which can include or not include, as suitable, any of the other features described herein, the base and the pendant are part of a communication system, and the communication system sends a possible accident signal upon a change in speed, of a piece of equipment to which the base is attached, of at least a threshold speed change amount within a threshold speed change time period.

In some embodiments according to the fifth aspect of the present inventive subject matter, which can include or not include, as suitable, any of the other features described herein, the pendant electromagnetic signal transmitter periodically sends an advertisement signal that includes an identification signal.

In some embodiments according to the fifth aspect of the present inventive subject matter, which can include or not include, as suitable, any of the other features described herein:
the base and the pendant are part of a communication system, and
the communication system issues a command that causes one or more lights on a piece of equipment to which the base is attached to be turned on upon both of (1) and (2) occurring within a preselected period of time:
(1) the communication system determining that the pendant is in medium proximity or near proximity to the base, and
(2) the communication system determining that an identification signal received from the pendant is valid.

In some embodiments according to the fifth aspect of the present inventive subject matter, which can include or not include, as suitable, any of the other features described herein:
the base and the pendant are part of a communication system, and
the communication system issues a command that an engine in a piece of equipment to which the base is attached to be turned on and idle upon all of (1)-(4) occurring within a preselected period of time:
(1) the communication system determining that the pendant is in close proximity or medium proximity to the base,
(2) the communication system determining that an identification signal received from the pendant is valid,
(3) the communication system determining that a PIN received from the pendant is valid,
(4) the base electromagnetic signal receiver receiving, from the pendant electromagnetic signal transmitter, a request that the piece of equipment turn on its engine.

In some aspects of the present inventive subject matter, there is provided a system (and components for such system, including a pendant and a base) that can be used with a first piece of equipment, and that is configured to identify the location of an operator (or another piece of equipment), where proximity to the first piece of equipment is necessary in order for the first piece of equipment to conform to certain conditional programmed computerized actions or responses. Furthermore, there is provided a system in which such a pendant and base can detect the location and/or identity of an operator (or other piece of equipment) and in which such a pendant (or components thereof) is/are sealed, and such a base (or components thereof) is/are sealed, so that they are sufficiently robust to withstand environments containing dust and can (if necessary) operate continuously, wide ranging temperatures and humidity, while providing the ability to recharge one or more batteries in the pendant, thereby avoiding sacrifices in ability to withstand harsh environments as well as avoiding the need to discontinue operation to replace batteries.

In some aspects of the present inventive subject matter, there is provided a system in which a piece of equipment can determine a degree of proximity of a pendant to the piece of equipment, while having the ability to communicate with the piece of equipment at longer distances. As an example of the typical states of a representative system: a first degree of proximity (e.g., "remote") can be where a pendant is at a distance from a base (which is mounted on the piece of equipment) that is beyond that which is pertinent to the piece of equipment (e.g., greater than three meters away); a second degree of proximity (e.g., "medium proximity") can be where the pendant is within a certain range of distance from the base (e.g., 0.02 to 3 meters away), such that the piece of equipment may make certain programmed operational actions (independent of or involving the pendant); and a third degree of proximity (e.g., "close proximity") can be where the pendant is close enough to the base (e.g., within 0.02 meters) that the other equipment may make certain other programmed operational actions (independent of or involving the pendant)(optionally including or not including some or all of the operational actions it can make when in the second degree of proximity).

In some aspects of the present inventive subject matter, there is provided a system comprising at least two parts (or a system comprising at least three parts), the first part being a sealed pendant containing a wireless radio for communications and an energy-retention component that is charged through a separate wireless power receiver; the second part being a base containing a wireless radio for communicating to the receiver and a second wireless circuit containing a transmitter for transmitting power to the wireless power receiver. The second part is connected to a power source within or separate from a piece of equipment (e.g., a piece of equipment on which the second part is mounted) and may or may not have a serial wired communication circuit that connects to a computer system in or on the piece of equipment (instead of through a serial wired communication circuit, or in addition to such a circuit, the base can communicate with the piece of equipment through a wireless communication that is the same as or similar to a wireless communication through which the pendant and the base communicate. The base may also contain one or more retaining structures that (when the pendant is in a degree of proximity to the base (e.g., close proximity) retains the pendant in such degree of proximity to the base. An optional third part may consist of a component that retains (or assists in retaining) the pendant in a particular degree of proximity (e.g., close proximity) relative to the base.

In some aspects of the present inventive subject matter, there can be provided a system as described above, in which the system comprises a tether that connects (e.g., releasably) the pendant to an operator or to another piece of equipment. In some embodiments in accordance with such aspects of the present inventive subject matter, the tether does not interfere with placement of the pendant onto the base, nor does it interfere with the communications or wireless power transfer.

The base may or may not comprise one or more retaining structures that (when the pendant is in a degree of proximity to the base, e.g., close proximity) retains the pendant in such degree of proximity to the base.

In some embodiments in accordance with the present inventive subject matter, which can include or not include any other features described herein, the base or any other retaining structure(s) can be configured such that the pendant can be removed from the base only by intentional removal of the pendant from the base, or such that certain unintentional forces allow the pendant to be removed from a degree of proximity (e.g., close proximity) relative to the base, so as to stay attached to a user or to another piece of equipment.

In some embodiments in accordance with the present inventive subject matter, which can include or not include any other features described herein, the pendant may or may not contain a motion sensor. In embodiments in which the pendant comprises a motion sensor, the motion sensor can be configured such that certain motions, such a tapping sequence, may invoke a wireless radio in the pendant to transfer specific data that would be translated by the piece of equipment as a command (or as commands) and/or as other information for user operation.

The inventive subject matter may be more fully understood with reference to the accompanying drawings and the following detailed description of the inventive subject matter.

BRIEF DESCRIPTION OF THE DRAWING FIGURES

FIG. 1 schematically depicts a first embodiment of an equipment system 10 in accordance with the present inventive subject matter.

Figure 2:
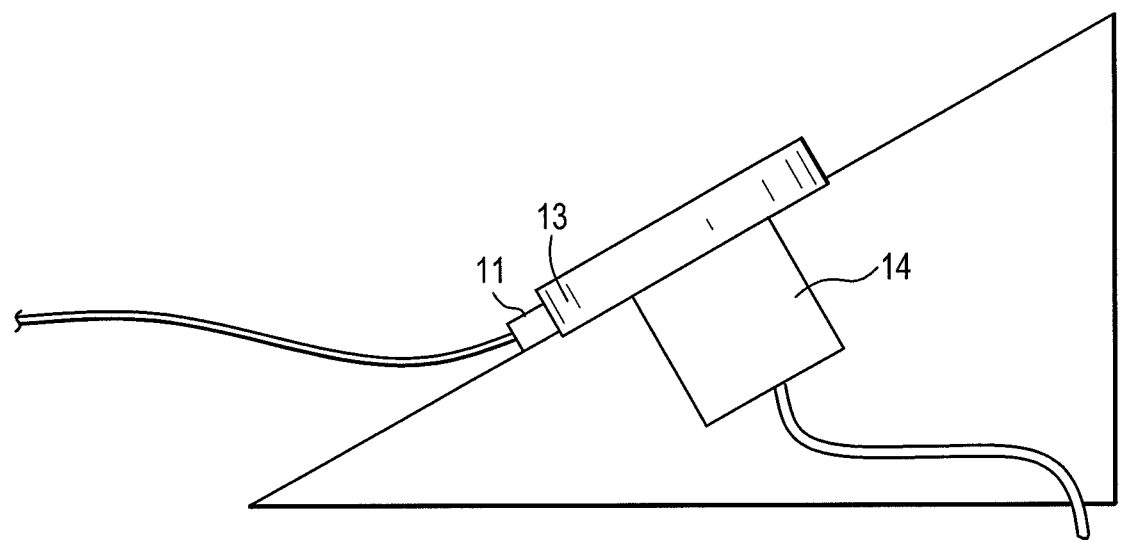

FIG. 2 schematically depicts the equipment system 10 with the pendant engaged with the socket 13 of the base 14.

Figure 3:
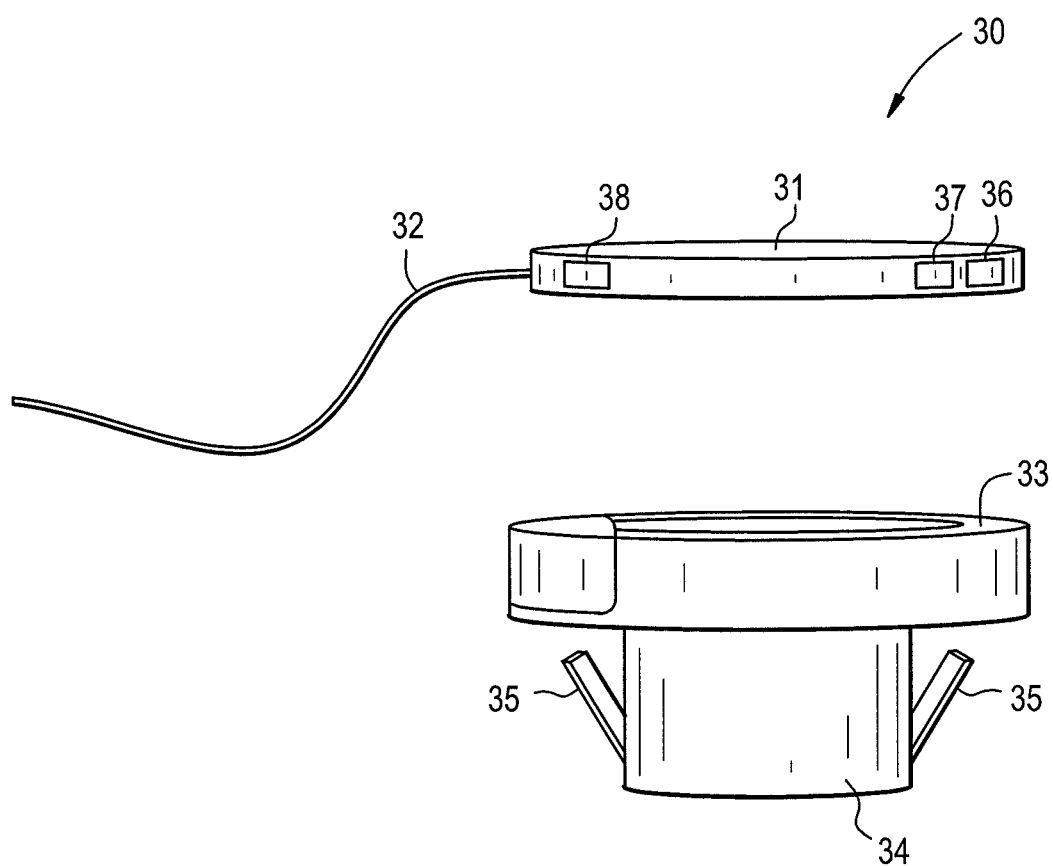

FIG. 3 schematically depicts a second embodiment of an equipment system 30 in accordance with the present inventive subject matter.

Figure 4:
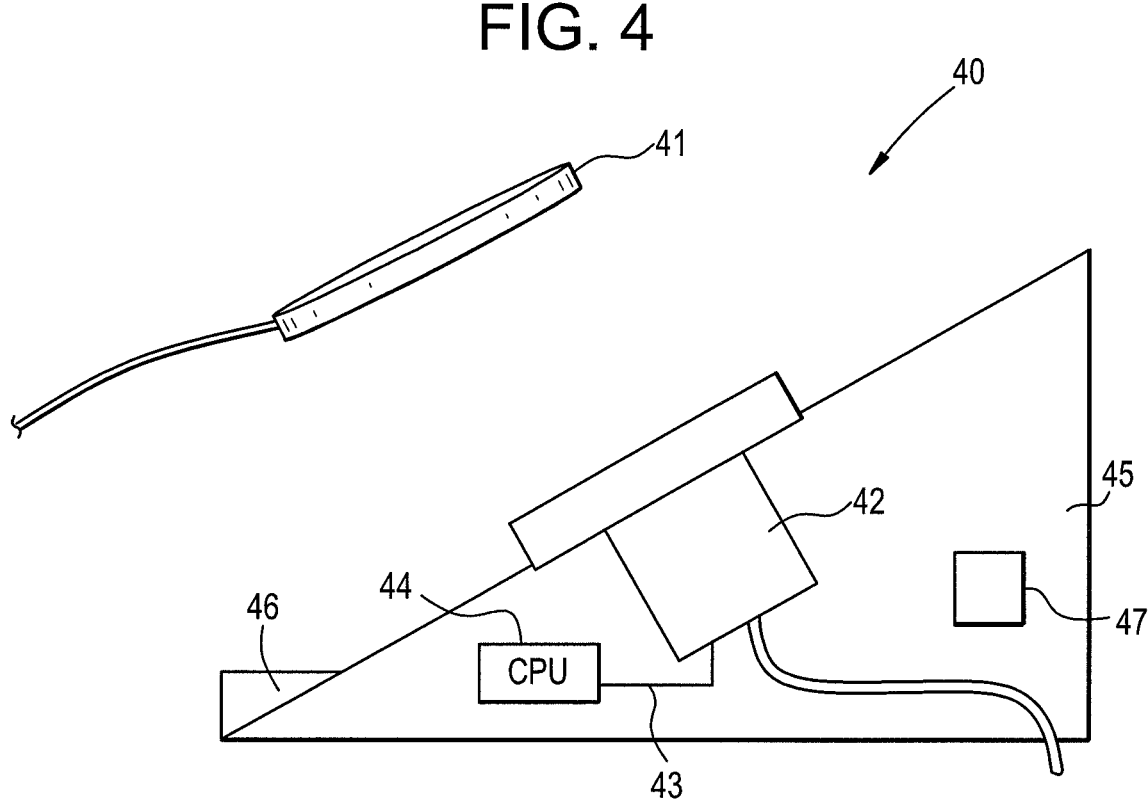

FIG. 4 schematically depicts a third embodiment of an equipment system 40 in accordance with the present inventive subject matter.

Figure 5:
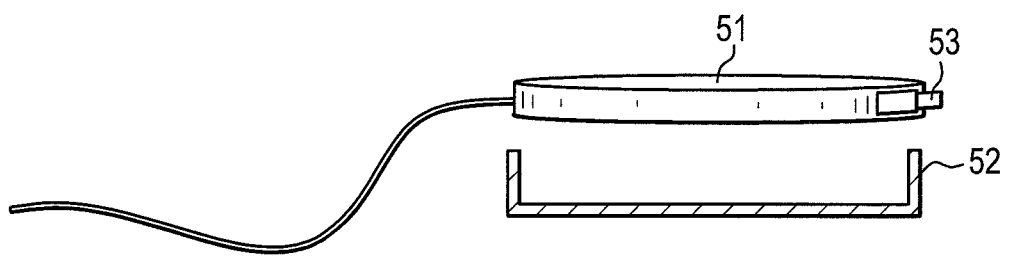

FIG. 5 schematically depicts a fourth embodiment of an equipment system 50 in accordance with the present inventive subject matter.

DETAILED DESCRIPTION OF THE INVENTIVE SUBJECT MATTER

The expression "close proximity" is used herein to indicate that one or more of a number of conditions is/are satisfied, the determination as to whether any of such conditions is satisfied being in each case objectively based on a value (or values) of one or more detected parameters, as described herein, i.e., (1) whether a power quantity that a wireless power receiver in a pendant is receiving from a wireless power transmitter in a base is equal to or greater than a pre-selected threshold power quantity, (2) whether a detected signal-reception-strength value, of a signal sent from a transmitter in a base and received by a receiver in a pendant, is equal to or greater than a pre-selected upper threshold signal-reception-strength value, (3) whether a detected signal-reception-strength value, of a signal sent from a transmitter in a pendant and received by a receiver in a base, is equal to or greater than a pre-selected upper threshold signal-reception-strength value, and (4) whether motion detected by a base motion detector corresponds to motion detected by a pendant motion detector to at least a pre-selected degree. The respective pre-selected values described above can be any suitable values, and persons making selections for such values might be influenced by many factors, e.g., the type of equipment, the capabilities of the equipment, the manner in which the equipment is expected to be operated (e.g., by professional racers or by novices), the environment in which the equipment is expected to be operated, etc.

Parameter (1) above, power quantity that a wireless power receiver in a pendant is receiving from a wireless power transmitter in a base typically falls off significantly (depending on the precise nature of the wireless power receiver and the wireless power transmitter) as distance between the wireless power receiver and the wireless power transmitter increases, e.g., there may be a significant difference in the power quantity at a spacing of 15 mm vs. at a spacing of 20 mm, and so the threshold value can (if desired) be set relatively low in comparison to the maximum power quantity value. It is to be recognized, as noted above, that the exact threshold used can be selected by the user based on the user's preferences and/or the situation in which the system is expected to be used, and the present inventive subject matter is not limited to any specific threshold values or ranges of values.

As is well known by persons of skill in the art, signal-reception-strength values (e.g., RSSI) for RF signals is a negative scale, with zero dBm being the highest likely RSSI power. A representative example of a close proximity threshold might be −6 dBm and higher. For actual implementation, it is possible that these will be scaled to positive numbers (such that a close proximity threshold might be 6 and lower). Again, it is to be recognized that the exact threshold used can be selected by the user based on the user's preferences and/or the situation in which the system is expected to be used, and the present inventive subject matter is not limited to any specific threshold values or ranges of values.

The degree to which motion detected by a base motion detector must correspond to motion detected by a pendant motion detector in order for a base and a pendant to be characterized as being in close proximity can be very high, especially where (with the pendant engaged with the base), there is a very small amount of freedom of motion of the pendant relative to the base. The degree to which motion detected by the base motion detector corresponds to motion detected by the pendant motion detector can be calculated in any suitable way, e.g., by using parameters detected by the respective motion sensors to calculate the distance that one component moves relative to the other (which, in many cases, would be expected to be very small, e.g., less than 1 cm, if the pendant remains engaged to the base). As above, it is to be recognized that the exact threshold used can be selected by the user based on the user's preferences and/or the situation in which the system is expected to be used, and the present inventive subject matter is not limited to any specific threshold values or ranges of values.

The expression "medium proximity" (analogous to the expression "close proximity") is used herein to indicate that one or more of a number of conditions is/are satisfied, the determination as to whether any of such conditions is satisfied being in each case objectively based on a value (or values) of one or more detected parameters, as described herein, i.e., (1) whether a detected signal-reception-strength value, of a signal sent from a transmitter in a base and received by a receiver in a pendant, is less than a pre-selected upper threshold signal-reception-strength value and equal to or greater than a pre-selected lower threshold signal-reception-strength value, (2) whether a detected signal-reception-strength value, of a signal sent from a transmitter in a pendant and received by a receiver in a base, is less than a pre-selected upper threshold signal-reception-strength value and equal to or greater than a pre-selected lower threshold signal-reception-strength value, and (3) whether motion detected by a base motion detector corresponds to motion detected by a pendant motion detector to a degree that falls within a pre-selected range or group of characterizations. As with the pre-selected values for "close proximity," the respective pre-selected values for "medium proximity" can be any suitable values, and persons making selections for such values might be influenced by many factors, e.g., the type of equipment, the capabilities of the equipment, the manner in which the equipment is expected to be operated (e.g., by professional racers or by novices), the environment in which the equipment is expected to be operated, etc. The notions discussed above in relation to "high proximity" value selections may apply in relation to selections of values for "medium proximity."

The expression "sealed," as used herein (e.g., in the expression "the pendant electromagnetic signal transmitter, the pendant electromagnetic signal receiver, the energy-retention component, the wireless power receiver and the charger sealed"), means that each listed component is at least partially covered by a material (e.g., a coating, a layer, etc.)(or a mixture of materials, or a plurality of materials or mixtures) that protects the component from being contacted by materials in the surrounding area (e.g., embedding a pendant electromagnetic signal transmitter, a pendant electromagnetic signal receiver, an energy-retention component, a wireless power receiver, and a charger in a unitary body made of epoxy, such that any material moving from outside the body of epoxy to any of the components would have to pass through at least one region of such epoxy). It is to be understood that a wide variety of materials can be used to seal any of the components, and the present inventive subject matter is not limited to any particular material(s) or composition(s). It is also to be understood that where two components are described as being sealed, the two components can both be sealed in a single unitary body or they can each be sealed in a separate unitary body. It is further to be recognized that no component of a pendant is sealed in a unitary body that also includes a component of a base (and vice-versa). In many instances, all of the components of the pendant are sealed in a first unitary body, and all of the components of the base are sealed in a second unitary body.

The expression "comprises" or "comprising," as used herein (e.g., in the expression "a pendant, comprising: a pendant electromagnetic signal transmitter; a pendant electromagnetic signal receiver; an energy-retention component; a wireless power receiver; and a charger"), is used in accordance with its well known usage, and means that the item that "comprises" the recited elements (or that is "comprising" the recited elements) includes at least the recited elements, and can optionally include any additional elements. For example, an item that "comprises a pendant, comprising: a pendant electromagnetic signal transmitter; a pendant electromagnetic signal receiver; an energy-retention component; a wireless power receiver; and a charger" includes at least one pendant electromagnetic signal transmitter, at least one pendant electromagnetic signal receiver, at least one energy-retention component, at least one wireless power receiver and at least one charger, i.e., it can include a single pendant or a plurality of pendants (and likewise can include a single pendant electromagnetic signal transmitter or a plurality of pendant electromagnetic signal transmitters; can include a single pendant electromagnetic signal receiver or a plurality of pendant electromagnetic signal receivers; can include a single energy-retention component or a plurality of rechargeable batteries; can include a single wireless power receiver or a plurality of wireless power receivers; and can include a single charger or a plurality of chargers).

The expression "engaged," as used herein (e.g., in the expression "the pendant is engaged with the base"), means that a force of at least a threshold disengagement force would be required to cause the pendant to move a significant distance (e.g., 3 cm) relative to the base, such that, e.g., with a pendant engaged with a base that is attached to a piece of equipment, if an operator is operating the piece of equipment with one end of a tether attached to the operator and the other end of the tether attached to the pendant, it is unlikely that the pendant will become disengaged from the base unless the operator falls off the piece of equipment (or becomes dislodged from a position that is suitable for operating the piece of equipment). Persons of skill in the art are familiar with a wide variety of ways to configure pendants and bases such that the pendant can be removably "engaged" (as defined herein) with a base, e.g., structurally (e.g., with spring-biased elements on one component that wrap partially around other component, with a pin that becomes dislodged upon being subjected to a large enough force), magnetically, frictionally, adhesively, etc.

The expression "attached," as used herein (e.g., in the expression "the base attached to the first piece of equipment"), means that the first structure, element or component that is "attached to" a second structure, element or component cannot be removed from the second structure without removing an attachment element (e.g., a screw or a bolt) or applying a significant force (much greater than the force required to disengage a pendant from a base).

The expression "plurality," as used herein, means two or more.

The present inventive subject matter encompasses many combinations of elements and features. The expression "In some embodiments in accordance with the present inventive subject matter, which can include or not include, as suitable, any of the other features described herein," or the like, is used in the present specification to introduce elements and/or features of the present inventive subject matter that can be included or not included in any particular embodiment, i.e., elements and/or features that can be combined in any suitable way. In other words, the present inventive subject matter encompasses all combinations of elements and/or features that are introduced with the expression "In some embodiments in accordance with the present inventive subject matter, which can include or not include, as suitable, any of the other features described herein," or the like.

As described above, the present inventive subject matter is directed to (1) pendants that each comprise a pendant electromagnetic signal transmitter, a pendant electromagnetic signal receiver, and a wireless power receiver (and optionally also an energy-retention component and a charger configured to charge the energy-retention component), (2) bases that each comprise a base electromagnetic signal transmitter, a base electromagnetic signal receiver, and a wireless power transmitter, (3) communication systems that each comprise a pendant and a base, (4) equipment systems that each comprise a communication system and at least a first piece of equipment, and (5) methods of communicating that involve a pendant and a base.

Any statement herein that a pendant, a base, a communication system, and/or an equipment system is configured to perform some action means that at least one component (or a combination of two or more components) in the pendant, base, communication system, and/or equipment system is configured to perform such action, e.g., a statement that a pendant detects a power level and a communication system (which comprises a pendant, a base and a processor) determines whether the power level is equal to or greater than a threshold power level can mean that a component in the pendant determines whether the power level is equal to or greater than the threshold power level, a component in the base determines whether the power level is equal to or greater than the threshold power level, or a component in the processor determines whether the power level is equal to or greater than the threshold power level.

Pendants in accordance with the present inventive subject matter can be of any suitable shape and can comprise any suitable materials and components that are capable of providing the combination of functions of any of the various embodiments of pendant described herein.

In some embodiments of communication systems or equipment systems according to the present inventive subject matter, which can include or not include, as suitable, any of the other features described herein, the pendant comprises at least one component configured to retain the pendant in close proximity to the base, and/or the base comprises at least one component configured to retain the pendant in close proximity to the base. In such embodiments, the structure or structures that is/are configured to retain the pendant in close proximity to the base (i.e., engaged with the base) can be any suitable structure or structures, and persons of skill in the art are familiar with a wide variety of such structures (e.g., spring-biased structures (wing tabs, pressure members, etc.), latches, mutually-engaging structures (e.g., a partially sphere-shaped member and a cap with flexible fingers that flex to fit over the partially sphere-shaped member to move into place and press on the partially sphere-shaped member when in place, etc.), snaps, magnets, velcro, etc.

Any suitable components can be used for pendant electromagnetic signal transmitters, pendant electromagnetic signal receivers, base electromagnetic signal transmitters and base electromagnetic signal receivers in pendants, bases, communication systems and equipment systems in accordance with the present inventive subject matter, and persons of skill in the art are familiar with a wide variety of such components. A pendant electromagnetic signal transmitter and a pendant electromagnetic signal receiver can together comprise a single pendant electromagnetic signal transceiver, and a base electromagnetic signal transmitter and a base electromagnetic signal receiver can together comprise a single base electromagnetic signal transceiver (in other words, a pendant electromagnetic signal transceiver constitutes a pendant electromagnetic signal transmitter and a pendant electromagnetic signal receiver, and a base electromagnetic signal transceiver constitutes a base electromagnetic signal transmitter and a base electromagnetic signal receiver). The expression "transmitter" is used herein to refer to components that are capable of emitting signals; the expression "receiver" is used herein to refer to components that are capable of receiving signals; the expression "transceiver" is used herein to refer to components that are capable of sending signals and receiving signals.

As described herein, embodiments of pendants comprise a wireless power receiver that is configured to wirelessly receive electrical energy from a wireless power transmitter of a base, if the pendant is in close proximity to the base. In some embodiments according to the present inventive subject matter, which can include or not include, as suitable, any of the other features described herein, the pendant can use power it receives from the wireless power transmitter to perform functions, rather than or in addition to charging an energy-retention component in the pendant.

Any suitable types of wireless power transmitters can be used in bases in accordance with the present inventive subject matter, any suitable types of wireless power receivers can be used in pendants in accordance with the present inventive subject matter, and any suitable compatible wireless power transmitter and wireless power receiver combinations can be employed in communication systems and equipment systems in accordance with the present inventive subject matter. For example, a wireless power transmitter can be low frequency (LF), radio frequency (RF), microwave (using electric field), inductive (using a magnetic field); a wireless power receiver can be low frequency (LF), radio frequency (RF), microwave, or inductive.

In some embodiments according to the present inventive subject matter, which can include or not include, as suitable, any of the other features described herein, the pendant is configured to determine a magnitude of power that a wireless power receiver is receiving from a wireless power transmitter, and/or the pendant is configured to determine whether the wireless power receiver is receiving, from the wireless power transmitter, power that is equal to or greater than a threshold power quantity, and/or the pendant is configured to cause a power-receiving-magnitude signal to be sent (e.g., from the pendant electromagnetic signal transmitter), the power-receiving-magnitude signal indicative of the magnitude of power that the wireless power receiver is receiving from the wireless power transmitter, and/or a communication system is configured to determine whether a power quantity that a wireless power receiver is receiving from the wireless power transmitter is equal to or greater than a threshold power quantity, and/or a communication system is configured to cause a power-quantity-received close-proximity signal to be sent upon determining that the wireless power receiver is receiving, from the wireless power transmitter, power that is equal to or greater than a threshold power quantity.

Any suitable types of energy-retention components can be used in pendants in accordance with the present inventive subject matter, e.g., a rechargeable battery can be used (with a charger in the pendant that is supplied with energy by a wireless power receiver), or a super-capacitor can be used.

Any suitable component or components can be used to avoid overcharging an energy-retention component (and/or to avoid sending power to an energy-retention component that is already charged to a desired degree), and persons of skill in the art are familiar with a variety of such components and combinations of components.

As described herein, in some embodiments according to the present inventive subject matter, which can include or not include, as suitable, any of the other features described herein, the base comprises a signal-reception-strength detector that is configured to detect a strength with which an electromagnetic signal (e.g., a signal emitted by the pendant electromagnetic signal transmitter) is received by the base electromagnetic signal receiver. Persons of skill in the art are familiar with a variety of signal-reception-strength detectors, and any such signal-reception-strength detector can be used in bases, communication systems and equipment systems in accordance with the present inventive subject matter. In some of such embodiments, the signal-reception-strength detector is configured to determine a detected signal-reception-strength value, the detected signal-reception-strength value is the strength with which a signal (e.g., a signal emitted from the pendant electromagnetic signal transmitter) is received by the base electromagnetic signal receiver.

As described herein, in some embodiments according to the present inventive subject matter, which can include or not include, as suitable, any of the other features described herein, the pendant comprises a signal-reception-strength detector that is configured to detect a strength with which an electromagnetic signal (e.g., a signal emitted by the base electromagnetic signal transmitter) is received by the pendant electromagnetic signal receiver. Persons of skill in the art are familiar with a variety of signal-reception-strength detectors, and any such signal-reception-strength detector can be used in pendants, communication systems and equipment systems in accordance with the present inventive subject matter. In some of such embodiments, the signal-reception-strength detector is configured to determine a detected signal-reception-strength value, the detected signal-reception-strength value is the strength with which a signal (e.g., a signal emitted from the base electromagnetic signal transmitter) is received by the pendant electromagnetic signal receiver.

In some embodiments of communication systems or equipment systems according to the present inventive subject matter, which can include or not include, as suitable, any of the other features described herein, the communication system (including any component thereof, e.g., the pendant or the base) is configured to determine whether a detected signal-reception-strength value is equal to or greater than an upper threshold signal-reception-strength value, and the communication system is configured to cause a reception-strength close-proximity signal to be sent upon the communication system determining that a detected signal-reception-strength value is equal to or greater than the upper threshold signal-reception-strength value. Representative values for an upper threshold signal-reception-strength value include, e.g., $-6$ dBm, $-7$ dBm, $-8$ dBm, $-9$ dBm, $-10$ dBm, etc. It is to be recognized that the exact threshold used can be selected by the user based on the user's preferences and/or the situation in which the system is expected to be used, and the present inventive subject matter is not limited to any specific threshold values or ranges of values.

In some embodiments of communication systems or equipment systems according to the present inventive subject matter, which can include or not include, as suitable, any of the other features described herein, the communication system (including any component thereof, e.g., the pendant or the base) is configured to determine whether a detected signal-reception-strength value is less than an upper threshold signal-reception-strength value and equal to or greater than a lower threshold signal-reception-strength value, and the communication system is configured to cause a reception-strength-medium-proximity signal to be sent upon the communication system determining that a detected signal-reception-strength value is less than the upper threshold signal-reception-strength value and equal to or greater than the lower threshold signal-reception-strength value. Representative values for a lower threshold signal-reception-strength value include, e.g., $-100$ dBm, $-90$ dBm, $-80$ dBm, $-110$ dBm, $-120$ dBm, etc. It is to be recognized that the exact threshold used can be selected by the user based on the user's preferences and/or the situation in which the system is expected to be used, and the present inventive subject matter is not limited to any specific threshold values or ranges of values.

As disclosed above, in some embodiments according to the present inventive subject matter, the pendant comprises a motion sensor. Persons of skill in the art are familiar with a wide variety of motion sensors, and any of such motion sensors can be employed. For example, motion sensors exist that detect acceleration (including change direction), speed, location (e.g., using GPS), etc.

As disclosed above, in some embodiments according to the present inventive subject matter, the base comprises a motion sensor. Persons of skill in the art are familiar with a wide variety of motion sensors, and any of such motion sensors can be employed. For example, motion sensors exist that detect acceleration (including change direction), speed, location (e.g., using GPS), etc.

As disclosed above, in some embodiments of communication systems or equipment systems according to the present inventive subject matter, the pendant comprises a pendant motion sensor and the base comprises a base motion sensor. In some of such embodiments:

the communication system is configured to cause a motion-detector close-proximity signal to be sent upon the communication system determining that an extent to which motion detected by the base motion detector is similar to motion detected by the pendant motion detector is equal to or greater than an upper threshold extent, and/or the communication system is configured to cause a motion-detector medium-proximity signal to be sent upon the communication system determining that an extent to which motion detected by the base motion detector is similar to motion detected by the pendant motion detector is less than an upper threshold extent and is equal to or greater than a lower threshold extent, and/or the communication system is configured to cause a motion-detector remote signal to be sent upon the communication system determining that an extent to which motion detected by the base motion detector is similar to motion detected by the pendant motion detector is less than a lower threshold extent.

It is to be recognized that the upper threshold extent and/or the lower threshold extent used can be selected by the user based on the user's preferences, and/or the situation in which the system is expected to be used, and/or the type of motion detection being used to compare the respective motions, and the present inventive subject matter is not limited to any specific threshold values or ranges of values. A representative value of an upper threshold extent is a detected difference in location (or distance traveled) of within 15 mm or within 20 mm; a representative value of a lower threshold extent is a detected difference in location (or distance traveled) of within 3 meters or within 10 meters.

In some embodiments according to the present inventive subject matter, which can include or not include, as suitable, any of the other features described herein, a pendant in accordance with the present inventive subject matter (and/or a pendant in a communication system or an equipment system in accordance with the present inventive subject matter) comprises a tether which is attached to a first region of the tether, and which has a second region that is configured to be removably attached to a person, to clothing on a person, to an accessory on a person, or to a piece of equipment (e.g., a machine such as a train car, a rocket booster, etc.), or to any other suitable thing. In some of such embodiments, the tether can contain conductive wiring for connection to other equipment on the end opposite the pendant (e.g., to supply power and/or wired communication through the tether).

As described above, some aspects of the present inventive subject matter are directed to equipment systems that each comprise a communication system and at least a first piece of equipment. In such aspects, the first piece of equipment can be any of a wide range of equipment (representative examples of such equipment can include, e.g., snowmobiles, personal water crafts, all-terrain vehicles, motorcycles, golf carts, etc.). The expression "equipment," as used herein, can refer to a piece of equipment or an assembly of a plurality of pieces of equipment (i.e., two or more pieces of equipment). Equipment can comprise one or more components and/or one or more sub-systems. Equipment can be mobile, stationary, or stationary at some times and mobile at others, the expression mobile including self-moving (such as motorized, e.g., a vehicle), movable by a vehicle (such as a trailer), or both self-moving and movable (such as a robot or a motorized trailer), the expression stationary meaning non-moving or movable only to a slight degree, such as a building (e.g., a temporary or permanent office), a site, a natural entity, or any other non-moving (or only slightly moving) physical structure.

As described above, some aspects of the present inventive subject matter are directed to equipment systems that comprise at least a first processor (some aspects of the present inventive subject matter are directed to communication systems that comprise at least a first processor). In such aspects, a first processor (or any number of processors) can be in the base, in the pendant, in the first piece of equipment, etc., and/or one or more processors can be in any of the base, the pendant, the first piece of equipment, etc.

Processors used in accordance with the present inventive subject matter can be any suitable processor, e.g., a CPU, an ECU, a microprocessor, a computer in a robot, etc. Any such processor can comprise one or more processing components. Functions performed by a "processor" can be performed by a single processor, or can be distributed among two or more processors, as is well known by persons of skill in the art.

Any processor in a communication system and/or an equipment system in accordance with the present inventive subject matter can communicate with the base in any suitable way (e.g., wirelessly via RF (such as bluetooth (e.g., BLE)), via a wire, such as via a serial bus, etc.).

A pendant in a communication system and/or an equipment system in accordance with the present inventive subject matter can communicate with a processor (or with multiple processors) in the communication system and/or the equipment system in any suitable way, e.g., via the base (e.g., the pendant sends a wireless signal (e.g., RF) to the base, and then the base sends the signal (or a signal containing some or all of the information sent by the pendant) to the processor in any suitable way (e.g., by wireless communication or by communication through a bus).

Any component in a pendant, and/or a base, and/or a communication system and/or an equipment system in accordance with the present inventive subject matter can, if desired, communicate in any way (e.g., wirelessly or through a wire) with any other component or components outside the pendant, and/or base, and/or communication system and/or equipment system, e.g., a fob, a smartphone, a wearable, a beacon, etc.

Any component in a pendant, and/or a base, and/or a communication system and/or an equipment system in accordance with the present inventive subject matter can, if desired, communicate in any way (e.g., wirelessly or through a wire) to any other component or components within the pendant, and/or base, and/or communication system and/or equipment system, e.g., to emit a signal (or signals) to transmit any information stored in the component or acquired by the component to any other such component, as desired.

In some embodiments according to the present inventive subject matter, which can include or not include, as suitable, any of the other features described herein, any component or components in a pendant, a base, a communication system and/or an equipment system is configured such that an operator can send a signal to any other desired component within or outside the pendant, a base, a communication system and/or an equipment system (so long as, in the case of a wireless transmission, the transmitting component is within range of the receiving component), e.g., the rider can send an SOS signal to the base, the base can pass the SOS signal to a processor, and the processor can cause the SOS to be sent out in one or more ways (e.g., as a satellite signal). In such embodiments, an operator can send a signal by any desired action or actions, e.g., by pressing a button (or a plurality of buttons, e.g., a sequence on a keyboard), by shaking the pendant in a particular way, by tapping on the pendant (and/or on a motion sensor), etc. (for example, certain motions, e.g., a tapping motion, can invoke a wireless radio (e.g., in the pendant) to transfer specific data to the first piece of equipment as commands (e.g., decelerate, execute a cruise control function, or other information for user operation)).

In some embodiments according to the present inventive subject matter, which can include or not include, as suitable, any of the other features described herein, the functions available to an operator, e.g., actions by the first piece of equipment, information provided to the operator, turning on or off systems (or sub-systems, such as computer controls, disengaging (and/or engaging) one or more hood latches, disengaging (and/or engaging) one or more access panel latches) in the first piece of equipment differ depending on whether the pendant (and thus the operator) is conjectured (e.g., by the communication system or by the equipment system) to be in close proximity to the base, in medium proximity to the base, or remote from the base.

In some embodiments according to the present inventive subject matter, which can include or not include, as suitable, any of the other features described herein, the pendant is configured such that an operator can access (through the pendant) information relating to the first piece of equipment (e.g., such information can include hours of use, diagnostic information (e.g., information regarding how to diagnose or troubleshoot a problem with the equipment, component or sub-system), information about how to make a repair, information about previous repairs, concerns or problems with the equipment, component or sub-system, information about parts for the equipment, component or sub-system, information about typical repair time for various issues with the equipment, component or sub-system, information about cost for parts for the equipment, component or sub-system, etc.). In some of such embodiments, an operator has access to such information only if (1) the pendant transmits a valid identification code and/or (2) the operator enters a valid PIN. In some of such embodiments, the operator has access to different scopes of information depending on whether the pendant is conjectured to be in near proximity to the base, in medium proximity to the base, or remote from the base.

In some embodiments according to the present inventive subject matter, which can include or not include, as suitable, any of the other features described herein, the pendant is configured to send wireless signals (to the base, to a processor and/or to any other component in a communication system or an equipment system) indicating the extent to which an energy-retention component in the pendant is charged.

In some embodiments according to the present inventive subject matter, which can include or not include, as suitable, any of the other features described herein, a processor (or processors) in a communication system and/or in an equipment system receives any close-proximity signals (power-quantity-received close-proximity signals, reception-strength close-proximity signals and motion-detector close-proximity signals) that are sent, any medium-proximity signals (reception-strength-medium-proximity signals and motion-detector medium-proximity signals) that are sent, and any remote signals (motion-detector remote signals), and based on any and all such signals, conjectures, at different times (e.g., every one-hundredth of a second) as to whether the pendant is in close proximity to the base, in medium proximity to the base, or remote from the base, at each such time.

As described above, a fifth aspect of the present inventive subject matter is directed to methods of communicating, comprising conjecturing a degree of proximity of a pendant to a base.

As described above, in some embodiments according to the present inventive subject matter, the base and the pendant are part of a communication system, and the communication system sends a possible accident signal upon a change, while a piece of equipment to which the base is attached is moving at a rate of at least a threshold speed, from (1) the pendant being conjectured to be in close proximity to the base to (2) the pendant being conjectured to not be in close proximity to the base. In such embodiments, the threshold speed can be any suitable speed, e.g., 10 miles per hour, 15 miles per hour, 20 miles per hour, 25 miles per hour, 30 miles per hour, 35 miles per hour, 40 miles per hour, etc. It is to be recognized that the exact threshold used can be selected by the user based on the user's preferences and/or the situation in which the system is expected to be used, and the present inventive subject matter is not limited to any specific threshold values or ranges of values.

As described above, in some embodiments according to the present inventive subject matter, the base and the pendant are part of a communication system, and the communication system sends a possible accident signal upon a change in speed, of a piece of equipment to which the base is attached, of at least a threshold speed change amount within a threshold speed change time period. In such embodiments, the threshold speed change amount and the threshold speed change time period can be any suitable values, e.g., the threshold speed change amount can be 10 miles per hour, 15 miles per hour, 20 miles per hour, 25 miles per hour, 30 miles per hour, 35 miles per hour, 40 miles per hour, etc., the threshold speed change time period can be ½ second, 1 second, 1.5 second, 2 seconds, etc. In some of such embodiments, there can be a number of combinations of such thresholds, such that if one or more of such combinations of thresholds is/are met, the communication system sends a possible accident signal (e.g., a speed change of at least 10 miles per hour in ½ second or less, a speed change of at least 20 miles per hour in 1 second or less, a speed change of at least 25 miles per hour in 1.2 seconds or less, a speed change of at least 30 miles per hour in 1.5 seconds or less, a speed change of at least 35 miles per hour in 2 seconds or less, etc.). It is to be recognized that the exact thresholds used can be selected by the user based on the user's preferences and/or the situation in which the system is expected to be used, and the present inventive subject matter is not limited to any specific threshold values or ranges of values.

Embodiments in accordance with the present inventive subject matter are described herein in detail in order to provide exact features of representative embodiments that are within the overall scope of the present inventive subject matter. The present inventive subject matter should be understood to be not limited to such detail.

FIG. 1 schematically depicts a first embodiment of an equipment system 10 in accordance with the present inventive subject matter. Referring to FIG. 1, the equipment system 10 comprises a pendant 11, a base 14 and a dashboard 15 (the dashboard 15 is part of a piece of equipment, e.g., a snowmobile). As shown in FIG. 1, a first end 17 of a tether 12 is attached to the pendant 11. A second end 18 of the tether 12 is configured to be engaged with an operator. The base 14 is attached to the dashboard 15, and the base 14 comprises a wireless base transceiver 19 (i.e., a combination wireless transmitter and a wireless receiver), a wireless power transmitter 20 and a base motion sensor 21. The base 14 also comprises a socket 13 with which the pendant can be removably engaged. The pendant 11 comprises a wireless power receiver 22, a wireless pendant transceiver 23 (i.e., a combination wireless transmitter and a wireless receiver), a pendant motion sensor 24, a charger 25 and an energy-retention component 26 (in the form of a rechargeable battery). Power is supplied to the base 14 through a wire 16. The pendant 11 is spaced from the base 14 by a distance (e.g., 1 meter) such that the pendant 11 is in medium proximity with the base 14.

The base 14 also comprises a signal-reception-strength detector 27 that is configured to detect a strength with which an electromagnetic signal emitted by the wireless pendant transceiver 23 is received by the wireless base transceiver 19.

The pendant 11 also comprises a signal-reception-strength detector 28 that is configured to detect a strength with which an electromagnetic signal emitted by the wireless base transceiver 19 is received by the wireless pendant transceiver 23.

FIG. 2 schematically depicts the equipment system 10 with the pendant 11 engaged with the socket 13 of the base 14, whereby the pendant 11 is in close proximity with the base 14.

FIG. 3 schematically depicts a second embodiment of an equipment system 30 in accordance with the present inventive subject matter. Referring to FIG. 3, the equipment system 30 comprises a pendant 31, a tether 32, a base 34 that comprises a socket 33, and spring-biased wing tabs 35. The pendant 31 comprises a BLE radio 38, a rechargeable coin cell battery 36, and circuitry 37 for re-charging the battery. The socket 33 is above a dashboard of a piece of equipment. The wing tabs 35 are configured to releasably engage with the pendant 31. The BLE radio communicates the status of the pendant 31 (close proximity/medium proximity/not close proximity or medium proximity; charging/not charging) to the resident BLE system. Connection of the pendant 31 to the socket 33 is for power only. Power conditioning is dependent on the source.

FIG. 4 schematically depicts a third embodiment of an equipment system 40 in accordance with the present inventive subject matter. Referring to FIG. 4, the equipment system 40 comprises a pendant 41, a base 42, a piece of equipment 45 (only a portion of the piece of equipment 45 is shown), a CPU 44 and a serial port 43 that connects the base 42 to the CPU 44. The equipment system comprises a light 46 and an engine 47.

FIG. 5 schematically depicts a fourth embodiment of an equipment system 50 in accordance with the present inventive subject matter. Referring to FIG. 5, the equipment system 50 comprises a pendant 51 and a base 52. The pendant 51 comprises a biased element 53 that is configured to releasably engage with the base 52.

The numbered sections below (1, 2, 3, 4, 5, 6, 7A, 7B, 8, 9, 10 and 11) describe a sequence of activities performed by an embodiment of an equipment system in accordance with the present inventive subject matter.

In the description below, for each numbered section, there is a description of (a) the proximity of the pendant to the base, (b) the action(s) taken by an operator or a machine with the pendant, (c) the action(s) taken by the base, and (d) the result(s).

In the description below:
the expression "==>>" indicates that the action(s) taken by an operator or a machine with the pendant prompts the action(s) taken by the base;
the expression "<<==" indicates that the action(s) taken by the base prompts the action(s) taken by the pendant; and
the expression "<<==>>" indicates that the respective action(s) taken by the base and by the operator or machine with the pendant prompts action(s) taken by each other.

1
(a) proximity of the pendant to the base:
 Outside of medium proximity
(b) action(s) taken by an operator or a machine with the pendant:
 Wireless Transmitter advertises periodically
==>>
(c) action(s) taken by the base:
 Wireless Receiver Scans for Pendants
(d) result(s):
 No change 2
(a) proximity of the pendant to the base:
 Within medium proximity
(b) action(s) taken by an operator or a machine with the pendant:
 Wireless Transmitter advertises periodically
==>>
(c) action(s) taken by the base:
 Wireless Receiver Detects Pendant transmissions
(d) result(s):
 Receiver confirms signal message against white list 3
(a) proximity of the pendant to the base:
 Within medium proximity
(b) action(s) taken by an operator or a machine with the pendant:
 Wireless Receiver completes connection
<<==
(c) action(s) taken by the base:
 Wireless Transmitter initiates connection
(d) result(s):
 Radios are connected.
 Machine initiates predetermined actions (i.e. headlights turn on)

4
(a) proximity of the pendant to the base:
 Within medium proximity
(b) action(s) taken by an operator or a machine with the pendant:
 Wireless Transmitter sends connection check with battery level
==>>
(c) action(s) taken by the base:
 Wireless Receiver acknowledges check
(d) result(s):
 Receiver determines RSSI is less than in-socket threshold.

5
(a) proximity of the pendant to the base:
 Within medium proximity
(b) action(s) taken by an operator or a machine with the pendant:
 Operator taps pendant with "approach code"
==>>
(c) action(s) taken by the base:
 Wireless Receiver acknowledges code
(d) result(s):
 Base sends code to ECU. ECU turns on other peripherals.

6
(a) proximity of the pendant to the base:
 Within close proximity
(b) action(s) taken by an operator or a machine with the pendant:
 Wireless Transmitter sends connection check with battery level
<<==>>
(c) action(s) taken by the base:
 Wireless Receiver acknowledges check
 1) Low Pendant Battery:
 2) Charged Pendant Battery"
(d) result(s):
 Receiver determines RSSI is above in-socket threshold.
 Sends message to vehicle ECU that pendant is socketed.
 1) Turns on power transmitter and monitors RSSI.
 2) Continues to monitor RSSI and battery level,"

7A
(a) proximity of the pendant to the base:
 Within close proximity
(b) action(s) taken by an operator or a machine with the pendant:
 Wireless Transmitter sends connection check with battery level
==>>
(c) action(s) taken by the base:
 (A) Wireless receiver acknowledges connection check.
 1) RSSI is below in-socket threshold.
 2) RSSI is above in-socket threshold.
(d) result(s):
 1) Receiver determines RSSI is above in-socket threshold.
 Sends message to vehicle ECU that pendant is socketed.
 Vehicle is allowed to move.
 2) Receiver determines RSSI is below in-socket threshold.
 Sends message to vehicle ECU that pendant is un-socketed.
 Vehicle is not allowed to move and stops if in motion.

7B
(a) proximity of the pendant to the base:
 Within close proximity
(b) action(s) taken by an operator or a machine with the pendant:
 Wireless Transmitter sends motion level.
==>>

(c) action(s) taken by the base:
(B) Wireless Receiver acknowledges motion level
  1) Low level motion level: (stopped or idling)
  2) High level motion level: (vehicle is moving)"
(d) result(s):
  Receiver determines RSSI is above in-socket threshold.
  Sends message to vehicle ECU that pendant is socketed and ECU compares motion.
  1) If vehicle is not moving, okay, otherwise, vehicle stops.
  2) If vehicle is moving, okay, otherwise, vehicle pauses before moving and checks pendant indicators, RSSI and battery charging level. This indicates that the pendant may have just been removed.
8
(a) proximity of the pendant to the base:
  Within medium proximity
(b) action(s) taken by an operator or a machine with the pendant:
  Wireless Transmitter sends connection check with battery level
==>>
(c) action(s) taken by the base:
  Wireless Receiver acknowledges check
(d) result(s):
  Receiver determines RSSI is less than in-socket threshold.
9
(a) proximity of the pendant to the base:
  Within medium proximity
(b) action(s) taken by an operator or a machine with the pendant:
  Wireless Transmitter sends connection check with battery level
<<==>>
(c) action(s) taken by the base:
  Wireless Receiver acknowledges check
  1) Low Pendant Battery:
  2) Charged Pendant Battery
(d) result(s):
  Receiver determines RSSI is above in-socket threshold.
  Sends message to vehicle ECU that pendant is socketed.
  1) Turns on power transmitter and monitors RSSI.
  2) Continues to monitor RSSI and battery level,
10
(a) proximity of the pendant to the base:
  Within medium proximity
(b) action(s) taken by an operator or a machine with the pendant:
  Wireless Transmitter sends motion level.
==>>
(c) action(s) taken by the base:
  Wireless Receiver acknowledges motion level
  1) Low level motion level: (stopped or idling)
  2) High level motion level: (vehicle is moving)"
(d) result(s):
  Receiver determines RSSI is above in-socket threshold.
  Sends message to vehicle ECU that pendant is socketed and ECU compares motion.
  1) If vehicle is not moving, okay, otherwise, vehicle stops.
  2) If vehicle is moving, okay, otherwise, vehicle pauses before moving and checks other pendant indicators. This indicates that the pendant may have just been removed.
11
(a) proximity of the pendant to the base:
  Outside of medium proximity
(b) action(s) taken by an operator or a machine with the pendant:
  Wireless Transmitter advertises periodically
==>>
(c) action(s) taken by the base:
  Wireless Receiver Scans for Pendants
(d) result(s):
  Connection is cancelled.

Below are a series of numbered paragraphs, each of which defines subject matter within the scope of the present inventive subject matter:

Paragraph 1. A communication system, comprising:
  a pendant and a base,
  the pendant comprising:
    a pendant electromagnetic signal transmitter;
    a pendant electromagnetic signal receiver; and
    a wireless power receiver,
  the base comprising:
    a base electromagnetic signal transmitter;
    a base electromagnetic signal receiver; and
    a wireless power transmitter,
  the wireless power receiver configured to wirelessly receive electrical energy from the wireless power transmitter, and
  the pendant electromagnetic signal transmitter, the pendant electromagnetic signal receiver, the wireless power receiver, the base electromagnetic signal transmitter, the base electromagnetic signal receiver and the wireless power transmitter are sealed.

Paragraph 2. A communication system as recited in Paragraph 1, wherein the pendant electromagnetic signal transmitter, the pendant electromagnetic signal receiver, and the wireless power receiver are sealed together as a first composite component, and the base electromagnetic signal transmitter, the base electromagnetic signal receiver and the wireless power transmitter are sealed together as a second composite component.

Paragraph 3. A communication system as recited in Paragraph 1, wherein:
  the pendant further comprises an energy-retention component and a charger,
  the charger is configured to receive energy from the wireless power receiver and charge the energy-retention component, and
  the energy-retention component and the charger are sealed.

Paragraph 4. A communication system as recited in Paragraph 3, wherein the wireless power receiver is configured to supply at least some of said electrical energy to the charger if (a) the pendant is in close proximity to the base, and (b) the energy-retention component is at a charge level that is less than a preset maximum charge level.

Paragraph 5. A communication system as recited in Paragraph 3, wherein the wireless power receiver is configured to wirelessly receive electrical energy from the wireless power transmitter and supply at least some of said electrical energy to the charger only if (1) the pendant is in close proximity to the base, and (2) the energy-retention component is at a charge level that is less than a preset maximum charge level.

Paragraph 6. A communication system as recited in Paragraph 1, wherein:
  the pendant electromagnetic signal transmitter and the pendant electromagnetic signal receiver together comprise a single pendant electromagnetic signal transceiver, and
  the base electromagnetic signal transmitter and the base electromagnetic signal receiver together comprise a single base electromagnetic signal transceiver.

Paragraph 7. A communication system as recited in Paragraph 1, wherein:
- the pendant electromagnetic signal transmitter is configured to transmit RF signals,
- the pendant electromagnetic signal receiver is configured to receive RF signals,
- the base electromagnetic signal transmitter is configured to transmit RF signals, and
- the base electromagnetic signal receiver is configured to receive RF signals.

Paragraph 8. A communication system as recited in Paragraph 1, wherein:
- the pendant further comprises a tether,
- a first region of the tether is attached to the pendant, and
- a second region of the tether is configured to be removably attached to a person, to clothing on a person, to an accessory on a person, or to a piece of equipment.

Paragraph 9. A communication system as recited in Paragraph 1, wherein the pendant comprises at least one component configured to retain the pendant in close proximity to the wireless power transmitter.

Paragraph 10. A communication system as recited in Paragraph 1, wherein the base further comprises at least one component configured to retain the pendant in close proximity to the wireless power transmitter.

Paragraph 11. A communication system as recited in Paragraph 1, wherein the pendant is engaged with the base.

Paragraph 12. A communication system as recited in Paragraph 1, wherein:
- the communication system is configured to conjecture whether the pendant is in close proximity to the base, and
- the communication system is configured to conjecture whether the pendant is in medium proximity to the base.

Paragraph 13. A communication system as recited in Paragraph 1, wherein the pendant is configured to determine a magnitude of power that the wireless power receiver is receiving from the wireless power transmitter.

Paragraph 14. A communication system as recited in Paragraph 13, wherein the pendant is configured to cause a power-receiving-magnitude signal to be sent from the pendant electromagnetic signal transmitter, the power-receiving-magnitude signal indicative of the magnitude of power that the wireless power receiver is receiving from the wireless power transmitter.

Paragraph 15. A communication system as recited in Paragraph 13, wherein:
- the communication system is configured to determine whether a power quantity that the wireless power receiver is receiving from the wireless power transmitter is equal to or greater than a threshold power quantity.

Paragraph 16. A communication system as recited in Paragraph 15, wherein the communication system is configured to cause a power-quantity-received close-proximity signal to be sent upon determining that the wireless power receiver is receiving, from the wireless power transmitter, power that is equal to or greater than a threshold power quantity.

Paragraph 17. A communication system as recited in Paragraph 1, wherein:
- the pendant is configured to determine whether the wireless power receiver is receiving, from the wireless power transmitter, power that is equal to or greater than a threshold power quantity.

Paragraph 18. A communication system as recited in Paragraph 17, wherein the communication system is configured to cause a power-quantity-received close-proximity signal to be sent upon determining that the wireless power receiver is receiving, from the wireless power transmitter, power that is equal to or greater than a threshold power quantity.

Paragraph 19. A communication system as recited in Paragraph 1, wherein the base further comprises a signal-reception-strength detector that is configured to detect a strength with which an electromagnetic signal emitted by the pendant electromagnetic signal transmitter is received by the base electromagnetic signal receiver.

Paragraph 20. A communication system as recited in Paragraph 19, wherein the signal-reception-strength detector is configured to determine a detected signal-reception-strength value, the detected signal-reception-strength value is the strength with which a signal emitted from the pendant electromagnetic signal transmitter is received by the base electromagnetic signal receiver.

Paragraph 21. A communication system as recited in Paragraph 20, wherein:
- the communication system is configured to determine whether a detected signal-reception-strength value is equal to or greater than an upper threshold signal-reception-strength value, and
- the communication system is configured to cause a reception-strength close-proximity signal to be sent upon the communication system determining that a detected signal-reception-strength value is equal to or greater than the upper threshold signal-reception-strength value.

Paragraph 22. A communication system as recited in Paragraph 20, wherein:
- the communication system is configured to determine whether a detected signal-reception-strength value is less than an upper threshold signal-reception-strength value and equal to or greater than a lower threshold signal-reception-strength value, and
- the communication system is configured to cause a reception-strength-medium-proximity signal to be sent upon the communication system determining that a detected signal-reception-strength value is less than the upper threshold signal-reception-strength value and equal to or greater than the lower threshold signal-reception-strength value.

Paragraph 23. A communication system as recited in Paragraph 1, wherein the pendant further comprises a signal-reception-strength detector that is configured to detect a strength with which an electromagnetic signal emitted by the base electromagnetic signal transmitter is being received by the pendant electromagnetic signal receiver.

Paragraph 24. A communication system as recited in Paragraph 23, wherein the signal-reception-strength detector is configured to determine a detected signal-reception-strength value, the detected signal-reception-strength value is the strength with which a signal emitted from the base electromagnetic signal transmitter is received by the pendant electromagnetic signal receiver.

Paragraph 25. A communication system as recited in Paragraph 24, wherein:
- the communication system is configured to determine whether a detected signal-reception-strength value is equal to or greater than an upper threshold signal-reception-strength value, and
- the communication system is configured to cause a reception-strength close-proximity signal to be sent upon the communication system determining that a detected signal-reception-strength value is equal to or greater than the upper threshold signal-reception-strength value.

Paragraph 26. A communication system as recited in Paragraph 24, wherein:
the communication system is configured to determine whether a detected signal-reception-strength value is less than an upper threshold signal-reception-strength value and equal to or greater than a lower threshold signal-reception-strength value, and
the communication system is configured to cause a reception-strength medium-proximity signal to be sent upon the communication system determining that a detected signal-reception-strength value is less than the upper threshold signal-reception-strength value and equal to or greater than the lower threshold signal-reception-strength value.

Paragraph 27. A communication system as recited in Paragraph 1, wherein the base further comprises a base motion sensor.

Paragraph 28. A communication system as recited in Paragraph 1, wherein:
the base further comprises a base motion detector, and
the pendant further comprises a pendant motion detector.

Paragraph 29. A communication system as recited in Paragraph 28, wherein:
the communication system is configured to compare an extent to which motion detected by the base motion detector corresponds to motion detected by the pendant motion detector.

Paragraph 30. A communication system as recited in Paragraph 29, wherein:
the communication system is configured to cause a motion-detector close-proximity signal to be sent upon the communication system determining that an extent to which motion detected by the base motion detector is similar to motion detected by the pendant motion detector is equal to or greater than an upper threshold extent.

Paragraph 31. A communication system as recited in Paragraph 29, wherein:
the communication system is configured to cause a motion-detector medium-proximity signal to be sent upon the communication system determining that an extent to which motion detected by the base motion detector is similar to motion detected by the pendant motion detector is less than an upper threshold extent and is equal to or greater than a lower threshold extent.

Paragraph 32. A communication system as recited in Paragraph 29, wherein:
the communication system is configured to cause a motion-detector remote signal to be sent upon the communication system determining that an extent to which motion detected by the base motion detector is similar to motion detected by the pendant motion detector is less than a lower threshold extent.

Paragraph 33. A communication system as recited in Paragraph 1, wherein the communication system is configured to issue a command that stops a piece of equipment to which the base is attached upon a change, while the piece of equipment is moving, from (1) the pendant being conjectured to be in close proximity to the base to (2) the pendant being conjectured to not be in close proximity to the base.

Paragraph 34. A communication system as recited in Paragraph 1, wherein the communication system is configured to send a possible accident signal upon a change, while a piece of equipment to which the base is attached is moving at a rate of at least a threshold speed, from (1) the pendant being conjectured to be in close proximity to the base to (2) the pendant being conjectured to not be in close proximity to the base.

Paragraph 35. A communication system as recited in Paragraph 1, wherein the communication system is configured to send a possible accident signal upon a change in speed, of a piece of equipment to which the base is attached, of at least a threshold speed change amount within a threshold speed change time period.

Paragraph 36. A communication system as recited in Paragraph 1, wherein the pendant electromagnetic signal transmitter is configured to periodically send an advertisement signal that includes an identification signal.

Paragraph 37. A communication system as recited in Paragraph 1, wherein the communication system is configured to issue a command that causes one or more lights on a piece of equipment to which the base is attached to be turned on upon both of (1) and (2) occurring within a preselected period of time:
(1) the communication system determining that the pendant is in medium proximity or near proximity to the base, and
(2) the communication system determining that an identification signal received from the pendant is valid.

Paragraph 38. A communication system as recited in Paragraph 1, wherein the communication system is configured to issue a command that an engine in a piece of equipment to which the base is attached be turned on and idle upon all of (1)-(4) occurring within a preselected period of time:
(1) the communication system determining that the pendant is in close proximity or medium proximity to the base,
(2) the communication system determining that an identification signal received from the pendant is valid,
(3) the communication system determining that a PIN received from the pendant is valid,
(4) the base electromagnetic signal receiver receiving, from the pendant electromagnetic signal transmitter, a request that the piece of equipment turn on its engine.

Paragraph 39. An equipment system, comprising:
a communication system as recited in Paragraph 1; and
at least a first piece of equipment,
the base attached to the first piece of equipment.

Paragraph 40. An equipment system as recited in Paragraph 39, wherein the first piece of equipment is a snowmobile.

Paragraph 41. An equipment system as recited in Paragraph 39, wherein the first piece of equipment is a personal water craft.

Paragraph 42. An equipment system as recited in Paragraph 39, wherein the equipment system comprises at least a first processor.

Paragraph 43. An equipment system as recited in Paragraph 42, wherein the first processor is in the base.

Paragraph 44. An equipment system as recited in Paragraph 42, wherein the first processor is in the first piece of equipment.

Paragraph 45. An equipment system as recited in Paragraph 39, wherein the pendant is configured to determine a magnitude of power that the wireless power receiver is receiving from the wireless power transmitter.

Paragraph 46. An equipment system as recited in Paragraph 45, wherein the pendant is configured to cause a power-receiving-magnitude signal to be sent from the pendant electromagnetic signal transmitter, the power-receiving-magnitude signal indicative of the magnitude of power that the wireless power receiver is receiving from the wireless power transmitter.

Paragraph 47. An equipment system as recited in Paragraph 46, wherein:
the communication system is configured to determine whether a power quantity that the wireless power receiver is receiving from the wireless power transmitter is equal to or greater than a threshold power quantity.

Paragraph 48. An equipment system as recited in Paragraph 47, wherein the communication system is configured to cause a power-quantity-received close-proximity signal to be sent from at least one component of the communication system to the first processor upon determining that the wireless power receiver is receiving, from the wireless power transmitter, power that is equal to or greater than a threshold power quantity.

Paragraph 49. An equipment system as recited in Paragraph 45, wherein:
the pendant is configured to determine whether the wireless power receiver is receiving, from the wireless power transmitter, power that is equal to or greater than a threshold power quantity.

Paragraph 50. An equipment system as recited in Paragraph 49, wherein the communication system is configured to cause a power-quantity-received close-proximity signal to be sent from at least one component of the communication system to the first processor upon determining that the wireless power receiver is receiving, from the wireless power transmitter, power that is equal to or greater than a threshold power quantity.

Paragraph 51. An equipment system as recited in Paragraph 39, wherein:
the base further comprises a signal-reception-strength detector, and
the signal-reception-strength detector is configured to determine a detected signal-reception-strength value, the detected signal-reception-strength value is the strength with which a signal emitted from the pendant electromagnetic signal transmitter is received by the base electromagnetic signal receiver.

Paragraph 52. An equipment system as recited in Paragraph 51, wherein:
the communication system is configured to determine whether a detected signal-reception-strength value is equal to or greater than an upper threshold signal-reception-strength value, and
the communication system is configured to cause a reception-strength close-proximity signal to be sent from at least one component of the communication system to the first processor upon the communication system determining that a detected signal-reception-strength value is equal to or greater than the upper threshold signal-reception-strength value.

Paragraph 53. An equipment system as recited in Paragraph 51, wherein:
the communication system is configured to determine whether a detected signal-reception-strength value is less than an upper threshold signal-reception-strength value and equal to or greater than a lower threshold signal-reception-strength value, and
the communication system is configured to cause a reception-strength-medium-proximity signal to be sent from at least one component of the communication system to the first processor upon the communication system determining that a detected signal-reception-strength value is less than the upper threshold signal-reception-strength value and equal to or greater than the lower threshold signal-reception-strength value.

Paragraph 54. An equipment system as recited in Paragraph 39, wherein:
the pendant further comprises a signal-reception-strength detector, and
the signal-reception-strength detector is configured to determine a detected signal-reception-strength value, the detected signal-reception-strength value is the strength with which a signal emitted from the base electromagnetic signal transmitter is received by the pendant electromagnetic signal receiver.

Paragraph 55. An equipment system as recited in Paragraph 54, wherein:
the communication system is configured to determine whether a detected signal-reception-strength value is equal to or greater than an upper threshold signal-reception-strength value, and
the communication system is configured to cause a reception-strength close-proximity signal to be sent from at least one component of the communication system to the first processor upon the communication system determining that a detected signal-reception-strength value is equal to or greater than the upper threshold signal-reception-strength value.

Paragraph 56. An equipment system as recited in Paragraph 54, wherein:
the communication system is configured to determine whether a detected signal-reception-strength value is less than an upper threshold signal-reception-strength value and equal to or greater than a lower threshold signal-reception-strength value, and
the communication system is configured to cause a reception-strength medium-proximity signal to be sent from at least one component of the communication system to the first processor upon the communication system determining that a detected signal-reception-strength value is less than the upper threshold signal-reception-strength value and equal to or greater than the lower threshold signal-reception-strength value.

Paragraph 57. An equipment system as recited in Paragraph 39, wherein:
the base further comprises a base motion detector, and
the pendant further comprises a pendant motion detector.

Paragraph 58. An equipment system as recited in Paragraph 57, wherein:
the communication system is configured to compare an extent to which motion detected by the base motion detector corresponds to motion detected by the pendant motion detector.

Paragraph 59. An equipment system as recited in Paragraph 58, wherein:
the communication system is configured to cause a motion-detector close-proximity signal to be sent from at least one component of the communication system to the first processor upon the communication system determining that an extent to which motion detected by the base motion detector is similar to motion detected by the pendant motion detector is equal to or greater than an upper threshold extent.

Paragraph 60. An equipment system as recited in Paragraph 58, wherein:
the communication system is configured to cause a motion-detector medium-proximity signal to be sent from at least one component of the communication system to the first processor upon the communication system determining that an extent to which motion detected by the base motion detector is similar to motion detected by the pendant motion detector is less than an upper threshold extent and is equal to or greater than a lower threshold extent.

Paragraph 61. An equipment system as recited in Paragraph 58, wherein:
the communication system is configured to cause a motion-detector remote signal to be sent from at least one component of the communication system to the first processor upon the communication system determining that an extent to which motion detected by the base motion detector is similar to motion detected by the pendant motion detector is less than a lower threshold extent.

Paragraph 62. An equipment system as recited in Paragraph 45, wherein:
the communication system is configured to conjecture whether the pendant is in close proximity to the base,
the communication system is configured to conjecture whether the pendant is in medium proximity to the base,
the first processor is configured to receive close-proximity signals and medium-proximity signals from at least one component of the communication system, and
the first processor is configured to make a temporal sequence of conjectures as to whether the pendant is (i) in close proximity to the base, (ii) in medium proximity to the base, or (iii) remote from the base, based on receipt by the first processor of a temporal sequence of events selected from among (1) receipt of close-proximity signals, (2) receipt of medium-proximity signals, and (3) time passages devoid of receipt of any signal selected from among close-proximity signals and medium-proximity signals.

Paragraph 63. An equipment system as recited in Paragraph 62, wherein the first processor is configured to change among a plurality of equipment-operation modes based on said temporal sequence of conjectures, each said equipment-operation mode comprising at least one of:
controlling functions automatically performed by the first piece of equipment based on (1) the temporal sequence of conjectures alone or (2) a combination of the temporal sequence of conjectures alone and one or more other pieces of data;
controlling functions automatically performed by the first processor based on (1) the temporal sequence of conjectures alone or (2) a combination of the temporal sequence of conjectures alone and one or more other pieces of data;
controlling whether information is provided to an authorized user upon the authorized user requesting such information;
controlling whether functions are performed by the first piece of equipment upon the authorized user requesting that the first piece of equipment perform such functions; and
controlling whether a signal is sent to at least a second piece of equipment, instructing the at least a second piece of equipment to perform one or more activities;
controlling whether the first piece of equipment and at least a second piece of equipment perform activities in relation to one another.

Paragraph 64. An equipment system as recited in Paragraph 45, wherein:
the communication system is configured to conjecture whether the pendant is in close proximity to the base,
the communication system is configured to conjecture whether the pendant is in medium proximity to the base,
the first processor is configured to receive close-proximity signals and medium-proximity signals from the base,
the first processor is configured to make a temporal sequence of conjectures as to whether the pendant is (i) in close proximity to the base, (ii) in medium proximity to the base, or (iii) remote from the base, based on receipt by the first processor of a temporal sequence of events selected from among (1) receipt of base-transmitted close-proximity signals, (2) receipt of base-transmitted medium-proximity signals, and (3) time passages devoid of receipt of any signal selected from among base-transmitted close-proximity signals and base-transmitted medium-proximity signals, and
the first processor is configured to change among a plurality of equipment-operation modes based on said temporal sequence of conjectures, each said equipment-operation mode comprising at least one of:
controlling functions automatically performed by the first piece of equipment based on (1) the temporal sequence of conjectures alone or (2) a combination of the temporal sequence of conjectures alone and one or more other pieces of data;
controlling functions automatically performed by the first processor based on (1) the temporal sequence of conjectures alone or (2) a combination of the temporal sequence of conjectures alone and one or more other pieces of data;
controlling whether information is provided to an authorized user upon the authorized user requesting such information;
controlling whether functions are performed by the first piece of equipment upon the authorized user requesting that the first piece of equipment perform such functions; and
controlling whether the first piece of equipment and at least a second piece of equipment perform activities in relation to one another.

Paragraph 65. A pendant, comprising:
a pendant electromagnetic signal transmitter;
a pendant electromagnetic signal receiver; and
a wireless power receiver,
the wireless power receiver is configured to receive electrical energy wirelessly,
the pendant electromagnetic signal transmitter, the pendant electromagnetic signal receiver, and the wireless power receiver are sealed.

Paragraph 66. A pendant as recited in Paragraph 65, wherein:
the pendant further comprises an energy-retention component and a charger,
the wireless power receiver is configured to receive electrical energy wirelessly and supply at least some of said electrical energy to the charger,
the charger is configured to charge the energy-retention component, and
the energy-retention component and the charger are sealed.

Paragraph 67. A pendant as recited in Paragraph 66, wherein the charger is configured to charge the energy-retention component only if the energy-retention component is at a charge level that is less than a preset maximum charge level.

Paragraph 68. A pendant as recited in Paragraph 65, wherein the pendant electromagnetic signal transmitter and the pendant electromagnetic signal receiver together comprise a single pendant electromagnetic signal transceiver.

Paragraph 69. A pendant as recited in Paragraph 65, wherein the pendant electromagnetic signal transmitter is configured to transmit RF signals, and the pendant electromagnetic signal receiver is configured to receive RF signals.

Paragraph 70. A pendant as recited in Paragraph 65, wherein:
the pendant further comprises a tether,
a first region of the tether is attached to the pendant, and
a second region of the tether is configured to be removably attached to a person, to clothing on a person, to an accessory on a person, or to a piece of equipment.

Paragraph 71. A pendant as recited in Paragraph 65, wherein the pendant further comprises at least one component configured to retain the pendant in close proximity to a wireless power transmitter in a base.

Paragraph 72. A pendant as recited in Paragraph 65, wherein the pendant is configured to determine a magnitude of power that the wireless power receiver is receiving from a wireless power transmitter.

Paragraph 73. A pendant as recited in Paragraph 72, wherein the pendant is configured to cause a power-receiving-magnitude signal to be sent from the pendant electromagnetic signal transmitter, the power-receiving-magnitude signal indicative of the magnitude of power that the wireless power receiver is receiving.

Paragraph 74. A pendant as recited in Paragraph 72, wherein:
the communication system is configured to determine whether a power quantity that the wireless power receiver is receiving from the wireless power transmitter is equal to or greater than a threshold power quantity.

Paragraph 75. A pendant as recited in Paragraph 74, wherein the communication system is configured to cause a power-quantity-received close-proximity signal to be sent upon determining that the wireless power receiver is receiving, from the wireless power transmitter, power that is equal to or greater than a threshold power quantity.

Paragraph 76. A pendant as recited in Paragraph 65, wherein:
the pendant is configured to determine whether the wireless power receiver is receiving, from the wireless power transmitter, power that is equal to or greater than a threshold power quantity.

Paragraph 77. A pendant as recited in Paragraph 76, wherein the communication system is configured to cause a power-quantity-received close-proximity signal to be sent upon determining that the wireless power receiver is receiving, from the wireless power transmitter, power that is equal to or greater than a threshold power quantity.

Paragraph 78. A pendant as recited in Paragraph 65, wherein the pendant further comprises a signal-reception-strength detector that is configured to detect a strength with which an electromagnetic signal is being received by the pendant electromagnetic signal receiver.

Paragraph 79. A pendant as recited in Paragraph 78, wherein:
the signal-reception-strength detector is configured to determine a detected signal-reception-strength value, the detected signal-reception-strength value is the strength with which a signal is received by the pendant electromagnetic signal receiver.

Paragraph 80. A pendant as recited in Paragraph 79, wherein:
the communication system is configured to determine whether a detected signal-reception-strength value is equal to or greater than an upper threshold signal-reception-strength value, and
the communication system is configured to cause a reception-strength close-proximity signal to be sent upon the communication system determining that a detected signal-reception-strength value is equal to or greater than the upper threshold signal-reception-strength value.

Paragraph 81. A pendant as recited in Paragraph 79, wherein:
the communication system is configured to determine whether a detected signal-reception-strength value is less than an upper threshold signal-reception-strength value and equal to or greater than a lower threshold signal-reception-strength value, and
the communication system is configured to cause a reception-strength medium-proximity signal to be sent upon the communication system determining that a detected signal-reception-strength value is less than the upper threshold signal-reception-strength value and equal to or greater than the lower threshold signal-reception-strength value.

Paragraph 82. A pendant as recited in Paragraph 65, wherein the pendant further comprises a pendant motion sensor.

Paragraph 83. A base, comprising:
a base electromagnetic signal transmitter;
a base electromagnetic signal receiver; and
a wireless power transmitter.

Paragraph 84. A base as recited in Paragraph 83, wherein the base electromagnetic signal transmitter and the base electromagnetic signal receiver together comprise a single base electromagnetic signal transceiver.

Paragraph 85. A base as recited in Paragraph 83, wherein the base electromagnetic signal transmitter is configured to transmit RF signals, and the base electromagnetic signal receiver is configured to receive RF signals.

Paragraph 86. A base as recited in Paragraph 83, wherein the base further comprises at least one component configured to retain a pendant in close proximity to the base.

Paragraph 87. A base as recited in Paragraph 83, wherein the base has a receive signal-reception-strength detector that is configured to detect a strength with which an electromagnetic signal is received by the base electromagnetic signal receiver.

Paragraph 88. A base as recited in Paragraph 87, wherein the signal-reception-strength detector is configured to determine a detected signal-reception-strength value, the detected signal-reception-strength value is the strength with which a signal is received by the base electromagnetic signal receiver.

Paragraph 89. A base as recited in Paragraph 88, wherein:
the communication system is configured to determine whether a detected signal-reception-strength value is equal to or greater than an upper threshold signal-reception-strength value, and
the communication system is configured to cause a reception-strength close-proximity signal to be sent upon the communication system determining that a detected signal-reception-strength value is equal to or greater than the upper threshold signal-reception-strength value.

Paragraph 90. A base as recited in Paragraph 88, wherein:
the communication system is configured to determine whether a detected signal-reception-strength value is less than an upper threshold signal-reception-strength value and equal to or greater than a lower threshold signal-reception-strength value, and
the communication system is configured to cause a reception-strength-medium-proximity signal to be sent upon the communication system determining that a detected signal-reception-strength value is less than the upper threshold signal-reception-strength value and equal to or greater than the lower threshold signal-reception-strength value.

Paragraph 91. A base as recited in Paragraph 83, wherein the base further comprises a base motion sensor.

Paragraph 92. A method of communicating, comprising conjecturing a degree of proximity of a pendant to a base by at least one action selected from among the group consisting of:
determining whether a power quantity that a wireless power receiver in the pendant is receiving from a wireless power transmitter in the base is equal to or greater than a threshold power quantity;
determining whether a detected signal-reception-strength value, of a signal sent from a transmitter in the base and received by a receiver in the pendant, is equal to or greater than an upper threshold signal-reception-strength value;
determining whether a detected signal-reception-strength value, of a signal sent from a transmitter in the pendant and received by a receiver in the base, is equal to or greater than the upper threshold signal-reception-strength value; and
comparing an extent to which motion detected by a motion detector in the base corresponds to motion detected by a motion detector in the pendant.

Paragraph 93. A method as recited in Paragraph 92, wherein:
the pendant comprises:
a pendant electromagnetic signal transmitter;
a pendant electromagnetic signal receiver;
an energy-retention component;
a wireless power receiver; and
a charger configured to charge the energy-retention component,
the base comprises:
a base electromagnetic signal transmitter;
a base electromagnetic signal receiver; and
a wireless power transmitter.

Paragraph 94. A method as recited in Paragraph 93, wherein the pendant electromagnetic signal transmitter, the pendant electromagnetic signal receiver, the energy-retention component, the wireless power receiver, the charger, the base electromagnetic signal transmitter, the base electromagnetic signal receiver and the wireless power transmitter are sealed.

Paragraph 95. A method as recited in Paragraph 92, wherein the method comprises:
determining whether a power quantity that the wireless power receiver in the pendant is receiving from the wireless power transmitter in the base is equal to or greater than a threshold power quantity, and
at least one of:
determining whether a detected signal-reception-strength value, of a signal sent from the transmitter in the base and received by the receiver in the pendant, is equal to or greater than an upper threshold signal-reception-strength value, and
determining whether a detected signal-reception-strength value, of a signal sent from the transmitter in the pendant and received by the receiver in the base, is equal to or greater than the upper threshold signal-reception-strength value.

Paragraph 96. A method as recited in Paragraph 95, wherein:
the pendant comprises:
a pendant electromagnetic signal transmitter;
a pendant electromagnetic signal receiver;
an energy-retention component;
a wireless power receiver; and
a charger configured to charge the energy-retention component,
the base comprises:
a base electromagnetic signal transmitter;
a base electromagnetic signal receiver; and
a wireless power transmitter, and
either (1) the base has a signal-reception-strength detector that is configured to detect a strength with which an electromagnetic signal emitted by the pendant electromagnetic signal transmitter is received by the base electromagnetic signal receiver, or (2) the pendant further comprises a signal-reception-strength detector that is configured to detect a strength with which an electromagnetic signal emitted by the base electromagnetic signal transmitter is being received by the pendant electromagnetic signal receiver.

Paragraph 97. A method as recited in Paragraph 95, wherein the method further comprises comparing an extent to which motion detected by a motion detector in the base corresponds to motion detected by a motion detector in the pendant.

Paragraph 98. A method as recited in Paragraph 97, wherein:
the pendant comprises:
a pendant electromagnetic signal transmitter;
a pendant electromagnetic signal receiver;
an energy-retention component;
a wireless power receiver;
a charger configured to charge the energy-retention component; and
a pendant motion sensor,
the base comprises:
a base electromagnetic signal transmitter;
a base electromagnetic signal receiver;
a wireless power transmitter; and
a base motion sensor, and
either (1) the base has a signal-reception-strength detector that is configured to detect a strength with which an electromagnetic signal emitted by the pendant electromagnetic signal transmitter is received by the base electromagnetic signal receiver, or (2) the pendant further comprises a signal-reception-strength detector that is configured to detect a strength with which an electromagnetic signal emitted by the base electromagnetic signal transmitter is being received by the pendant electromagnetic signal receiver.

Paragraph 99. A method as recited in Paragraph 92, wherein the method further comprises charging an energy-retention component in the pendant with at least some of said electrical energy received by the wireless power receiver.

Paragraph 100. A method as recited in Paragraph 92, wherein a piece of equipment to which the base is attached stops moving upon a change, while the piece of equipment is moving, from (1) the pendant being conjectured to be in close proximity to the base to (2) the pendant being conjectured to not be in close proximity to the base.

Paragraph 101. A method as recited in Paragraph 92, wherein the base and the pendant are part of a communication system, and the communication system sends a possible accident signal upon a change, while a piece of equipment to which the base is attached is moving at a rate of at least a threshold speed, from (1) the pendant being conjectured to be in close proximity to the base to (2) the pendant being conjectured to not be in close proximity to the base.

Paragraph 102. A method as recited in Paragraph 92, wherein the base and the pendant are part of a communication system, and the communication system sends a possible accident signal upon a change in speed, of a piece of equipment to which the base is attached, of at least a threshold speed change amount within a threshold speed change time period.

Paragraph 103. A method as recited in Paragraph 92, wherein the pendant electromagnetic signal transmitter periodically sends an advertisement signal that includes an identification signal.

Paragraph 104. A method as recited in Paragraph 92, wherein:
the base and the pendant are part of a communication system, and
the communication system issues a command that causes one or more lights on a piece of equipment to which the base is attached to be turned on upon both of (1) and (2) occurring within a preselected period of time:
  (1) the communication system determining that the pendant is in medium proximity or near proximity to the base, and
  (2) the communication system determining that an identification signal received from the pendant is valid.

Paragraph 105. A method as recited in Paragraph 92, wherein:
the base and the pendant are part of a communication system, and
the communication system issues a command that an engine in a piece of equipment to which the base is attached to be turned on and idle upon all of (1)-(4) occurring within a preselected period of time:
  (1) the communication system determining that the pendant is in close proximity or medium proximity to the base,
  (2) the communication system determining that an identification signal received from the pendant is valid,
  (3) the communication system determining that a PIN received from the pendant is valid,
  (4) the base electromagnetic signal receiver receiving, from the pendant electromagnetic signal transmitter, a request that the piece of equipment turn on its engine.

Many alterations and modifications may be made by those having ordinary skill in the art, given the benefit of the present disclosure, without departing from the spirit and scope of the inventive subject matter, and all of such alterations and modifications are within the scope of the present inventive subject matter.

The invention claimed is:

1. A communication system, comprising:
a pendant and a base,
the pendant comprising:
  a pendant electromagnetic signal transmitter;
  a pendant electromagnetic signal receiver; and
  a wireless power receiver,
the base comprising:
  a base electromagnetic signal transmitter;
  a base electromagnetic signal receiver; and
  a wireless power transmitter,
the wireless power receiver configured to wirelessly receive electrical energy from the wireless power transmitter, wherein:
  the base further comprises a base motion detector,
  the pendant further comprises a pendant motion detector, and
  the communication system is configured to compare an extent to which motion detected by the base motion detector corresponds to motion detected by the pendant motion detector.

2. A communication system, comprising:
a pendant and a base,
the pendant comprising:
  a pendant electromagnetic signal transmitter;
  a pendant electromagnetic signal receiver; and
  a wireless power receiver,
the base comprising:
  a base electromagnetic signal transmitter;
  a base electromagnetic signal receiver; and
  a wireless power transmitter,
the wireless power receiver configured to wirelessly receive electrical energy from the wireless power transmitter, wherein the communication system is configured to issue a command that an engine in a piece of equipment to which the base is attached be turned on and idle upon all of (1)-(4) occurring within a preselected period of time:
  (1) the communication system determining that the pendant is in close proximity or medium proximity to the base,
  (2) the communication system determining that an identification signal received from the pendant is valid,
  (3) the communication system determining that a PIN received from the pendant is valid,
  (4) the base electromagnetic signal receiver receiving, from the pendant electromagnetic signal transmitter, a request that the piece of equipment turn on its engine.

3. A method of communicating, comprising conjecturing a degree of proximity of a pendant to a base by comparing an extent to which motion detected by a motion detector in the base corresponds to motion detected by a motion detector in the pendant,
the pendant comprising:
  a pendant electromagnetic signal transmitter;
  a pendant electromagnetic signal receiver; and
  a wireless power receiver,
the base comprising:
  a base electromagnetic signal transmitter;
  a base electromagnetic signal receiver; and
  a wireless power transmitter.

4. A method as recited in claim 3, wherein the method comprises:
determining whether a power quantity that the wireless power receiver in the pendant is receiving from the wireless power transmitter in the base is equal to or greater than a threshold power quantity, and at least one of:
- determining whether a detected signal-reception-strength value, of a signal sent from the transmitter in the base and received by the receiver in the pendant, is equal to or greater than an upper threshold signal-reception-strength value, and
- determining whether a detected signal-reception-strength value, of a signal sent from the transmitter in the pendant and received by the receiver in the base, is equal to or greater than the upper threshold signal-reception-strength value.

\* \* \* \* \*